(12) United States Patent
Hachmeyer et al.

(10) Patent No.: US 9,669,661 B2
(45) Date of Patent: Jun. 6, 2017

(54) TIRE ASSEMBLY FOR A BICYCLE RIM

(71) Applicants: Markus Hachmeyer, Wiehl (DE); Oliver Zuther, Landau (DE)

(72) Inventors: Markus Hachmeyer, Wiehl (DE); Oliver Zuther, Landau (DE)

(73) Assignee: RALF BOHLE GMBH, Reichshof (DE)

( * ) Notice: Subject to any disclaimer, the term of this patent is extended or adjusted under 35 U.S.C. 154(b) by 318 days.

(21) Appl. No.: 14/501,671

(22) Filed: Sep. 30, 2014

(65) Prior Publication Data

US 2015/0090385 A1 Apr. 2, 2015

(30) Foreign Application Priority Data

Oct. 1, 2013 (DE) .................. 20 2013 008 966
Jul. 23, 2014 (DE) .................. 20 2014 006 003
Aug. 15, 2014 (EP) ...................... 14181182

(51) Int. Cl.
*B60C 5/02* (2006.01)
*B60C 5/04* (2006.01)
(Continued)

(52) U.S. Cl.
CPC .................. *B60C 5/22* (2013.01); *B60C 5/02* (2013.01); *B60C 5/04* (2013.01); *B60C 15/032* (2013.01);
(Continued)

(58) Field of Classification Search
CPC .. B60C 5/02; B60C 5/025; B60C 5/04; B60C 5/08; B60C 5/10; B60C 5/20; B60C 5/22; B60C 5/24; B60C 19/00; B60C 19/12
See application file for complete search history.

(56) References Cited

U.S. PATENT DOCUMENTS 2,991,821 A 7/1961 Williams
3,476,168 A 11/1969 Huber et al.
(Continued)

FOREIGN PATENT DOCUMENTS

DE  1 755 378 A1  12/1971
DE  24 38 633 A    3/1976
(Continued)

OTHER PUBLICATIONS

German Patent Office Search Report issued in Application No. 20 2013 008 966.0 dated Oct. 22, 2013 (5 pages).
(Continued)

*Primary Examiner* — Justin Fischer
(74) *Attorney, Agent, or Firm* — Flynn, Thiel, Boutell & Tanis, P.C.

(57) ABSTRACT

Tire assembly for a bicycle rim, including a wheel tire with a tread surface and two tire beads, an inner tire disposed within the wheel tire, a tube disposed within the inner tire, and a valve arrangement for filling the tube and an intermediate space between the rim and the wheel tire with different air pressures. The inner tire in the filled and mounted condition bears on the tire beads of the wheel tire and presses the beads against the rim. The inner tire has a first through opening which in the mounted condition communicates with the intermediate space, and an insert part disposed between the rim and the tube and between the tube and the inner tire. The insert part forms an air duct between the rim and the tube and between the tube and the inner tire up to the through opening in the inner tire.

21 Claims, 23 Drawing Sheets

(51) Int. Cl.
  *B60C 29/00* (2006.01)
  *B60C 5/22* (2006.01)
  *B60C 29/04* (2006.01)
  *B60C 15/032* (2006.01)

(52) U.S. Cl.
  CPC .......... *B60C 29/005* (2013.01); *B60C 29/007* (2013.04); *B60C 29/04* (2013.01); *B60C 2200/12* (2013.04); *Y10T 152/10594* (2015.01)

(56) References Cited

U.S. PATENT DOCUMENTS

| | | |
|---|---|---|
| 6,209,601 B1 | 4/2001 | Mark |
| 6,688,359 B2 | 2/2004 | Blalock et al. |
| 6,712,107 B2 | 3/2004 | Clouet |
| 7,131,477 B2 | 11/2006 | Smith |
| 7,669,627 B2 | 3/2010 | Douglas |
| 2004/0177908 A1 | 9/2004 | Hsieh |
| 2004/0177910 A1 | 9/2004 | Chen |
| 2005/0167023 A1* | 8/2005 | Smith ........................ B60C 5/22 152/400 |
| 2007/0256769 A1 | 11/2007 | Douglas |
| 2010/0096056 A1 | 4/2010 | Smith |
| 2010/0116396 A1 | 5/2010 | Douglas |
| 2010/0206449 A1 | 8/2010 | Jang |
| 2012/0097309 A1 | 4/2012 | Christensen et al. |

FOREIGN PATENT DOCUMENTS

| | | |
|---|---|---|
| EP | 0 695 651 A1 | 2/1996 |
| EP | 2 110 268 A1 | 10/2009 |
| EP | 2 110 268 B1 | 10/2009 |
| EP | 2 173 572 B1 | 4/2010 |
| GB | 890724 * | 3/1962 |
| GB | 975348 * | 11/1964 |

OTHER PUBLICATIONS

European Patent Office Search Report issued in Application No. 14 18 1182 with English translation of category of cited documents dated Feb. 16, 2015 (8 pages).

* cited by examiner

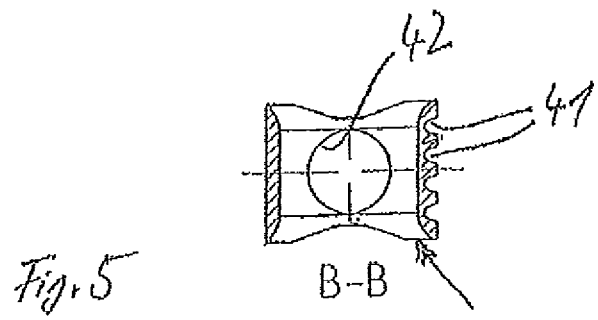
Fig. 5
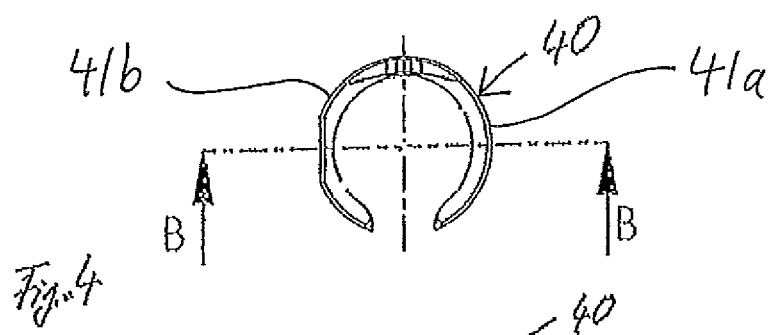
Fig. 4
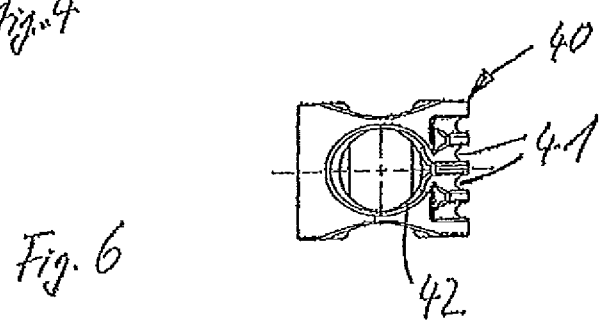
Fig. 6
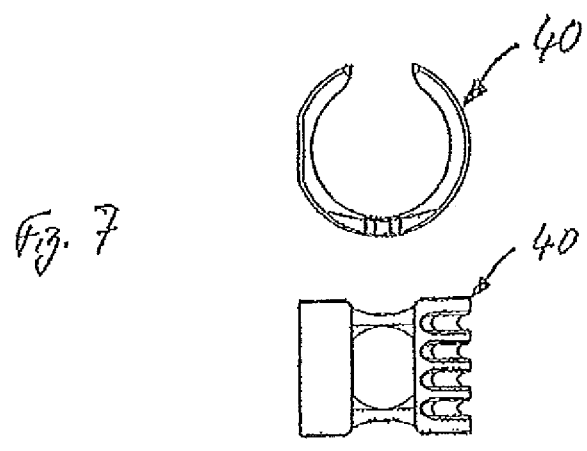
Fig. 7
Fig. 8

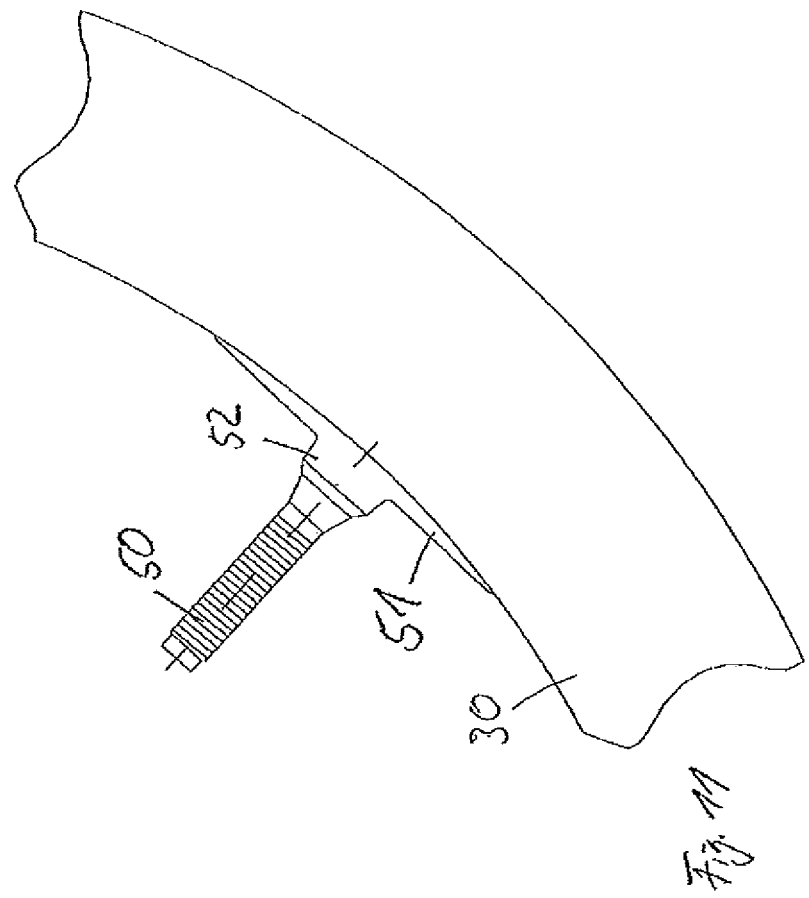
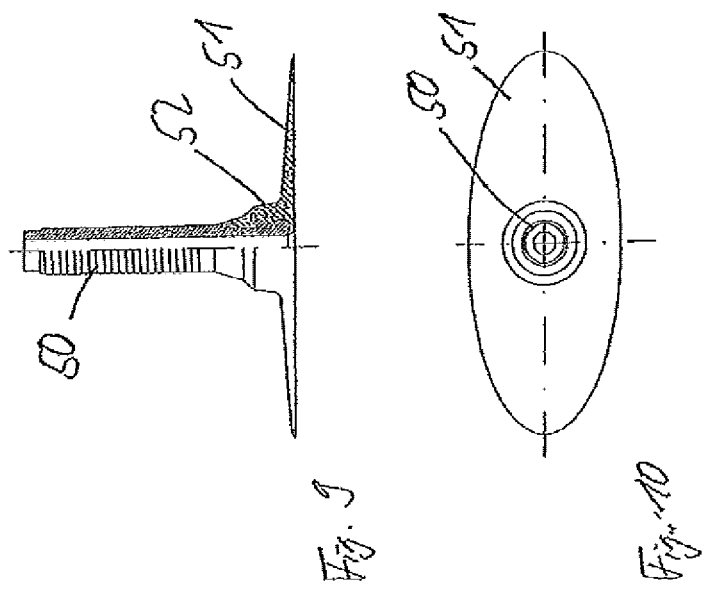

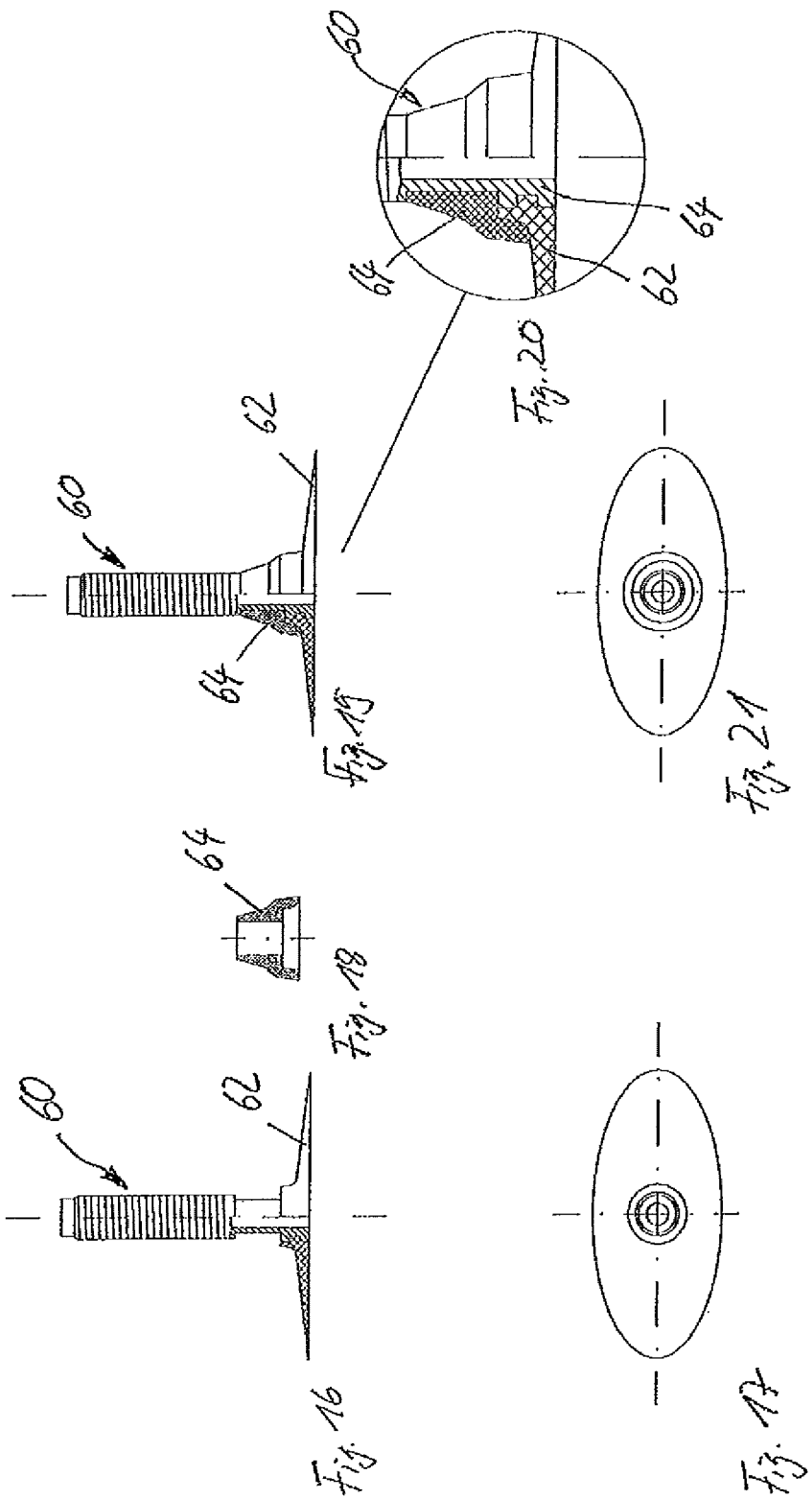

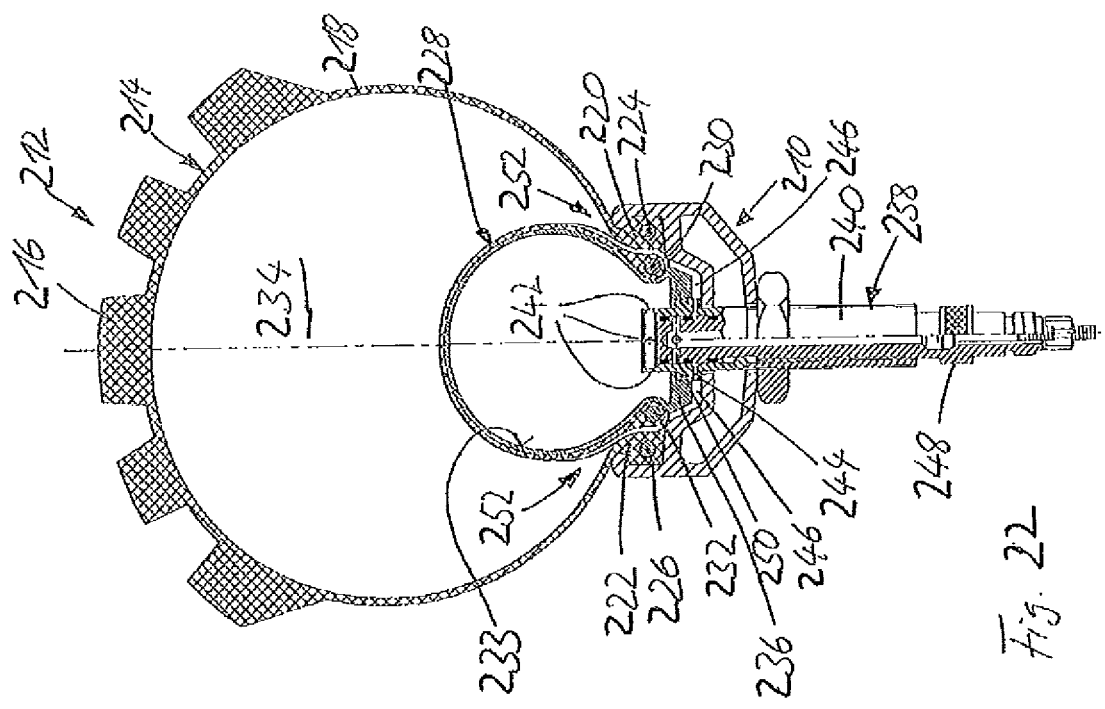
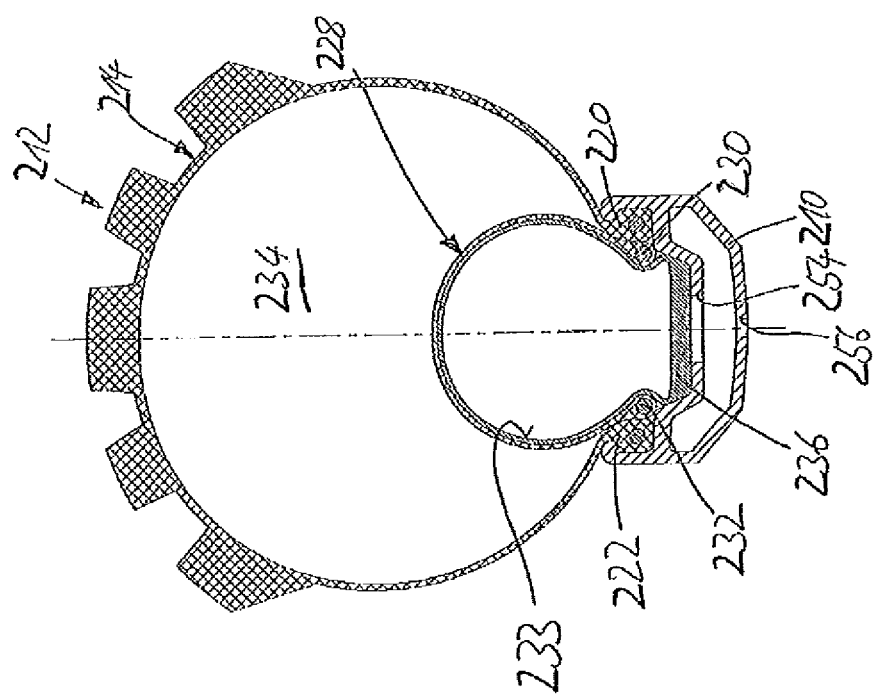

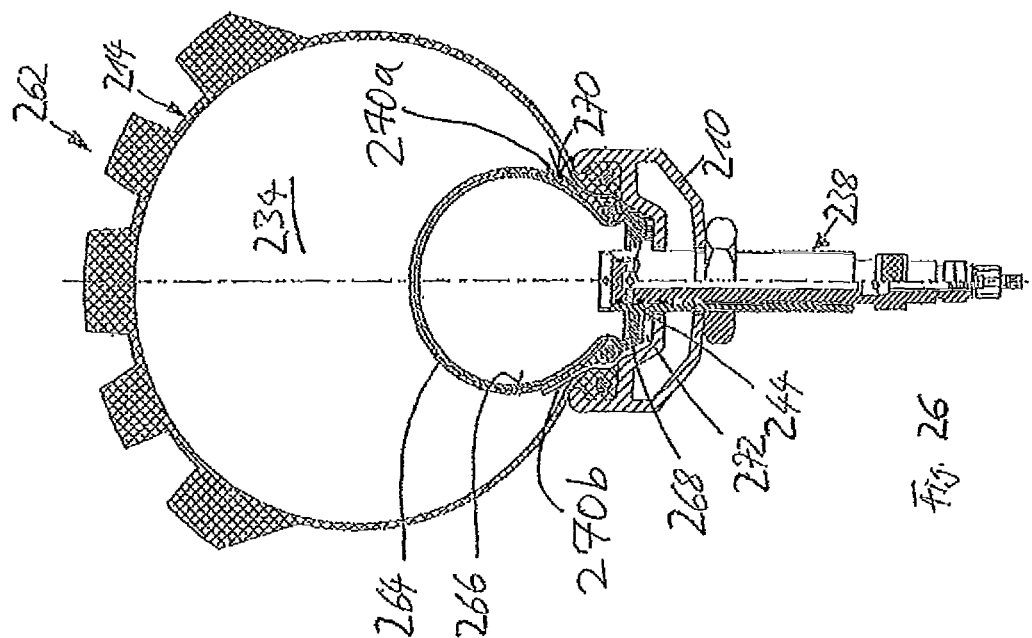
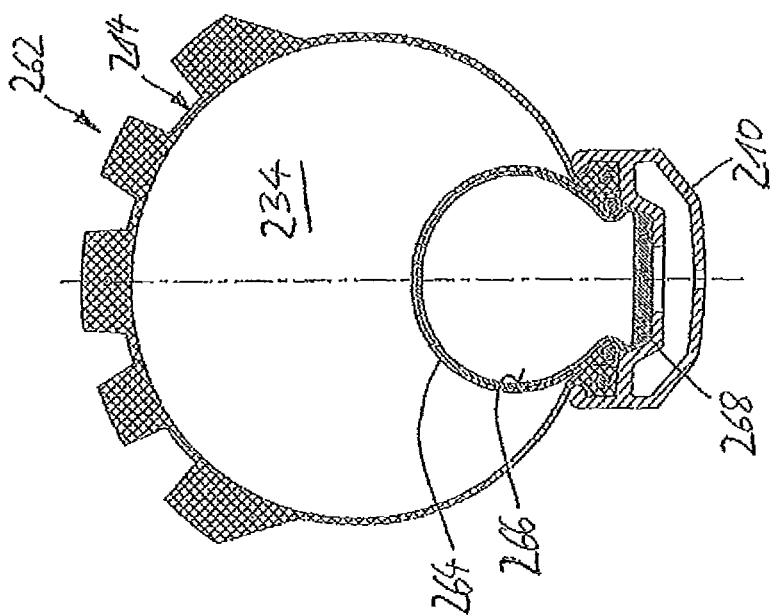

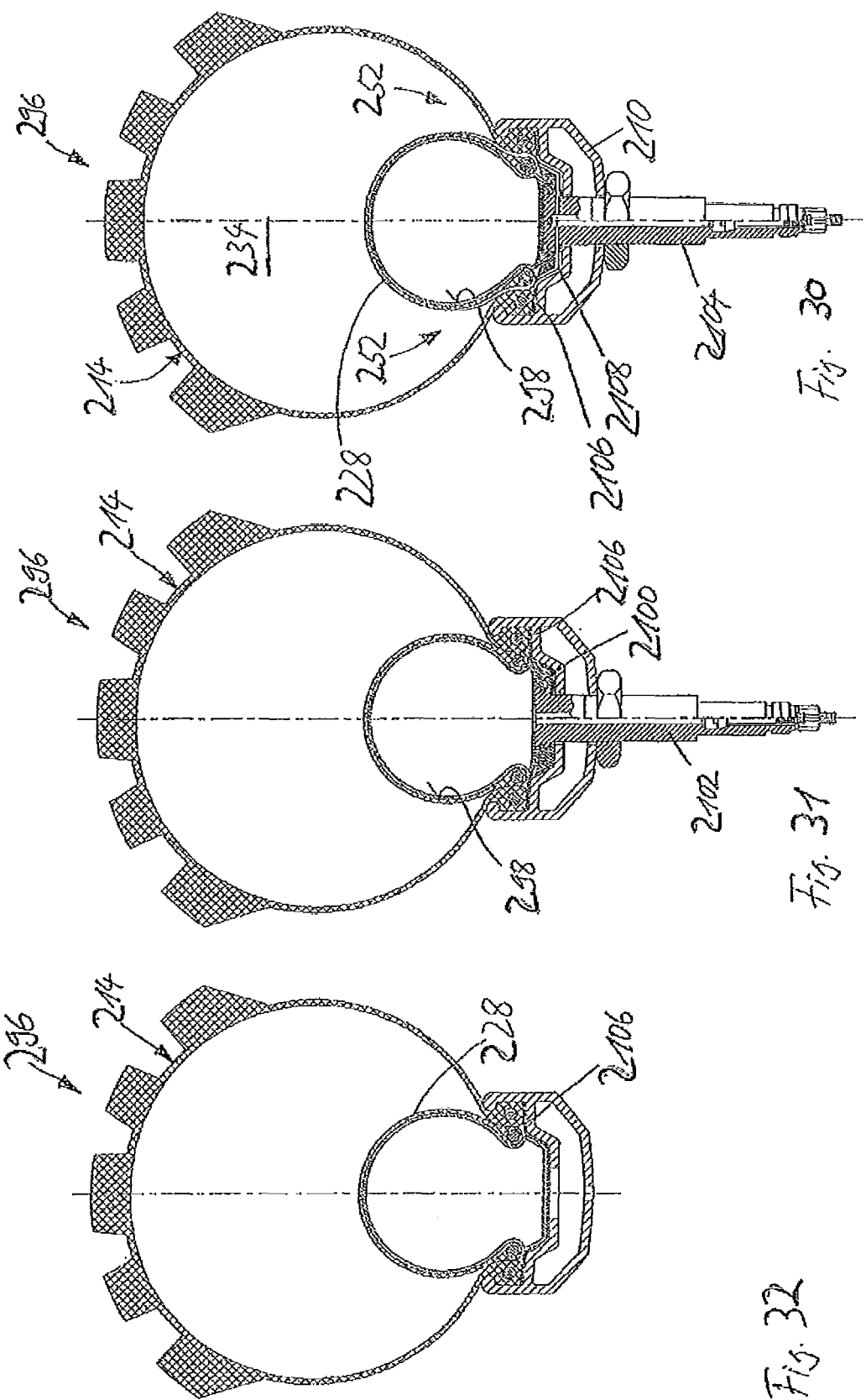

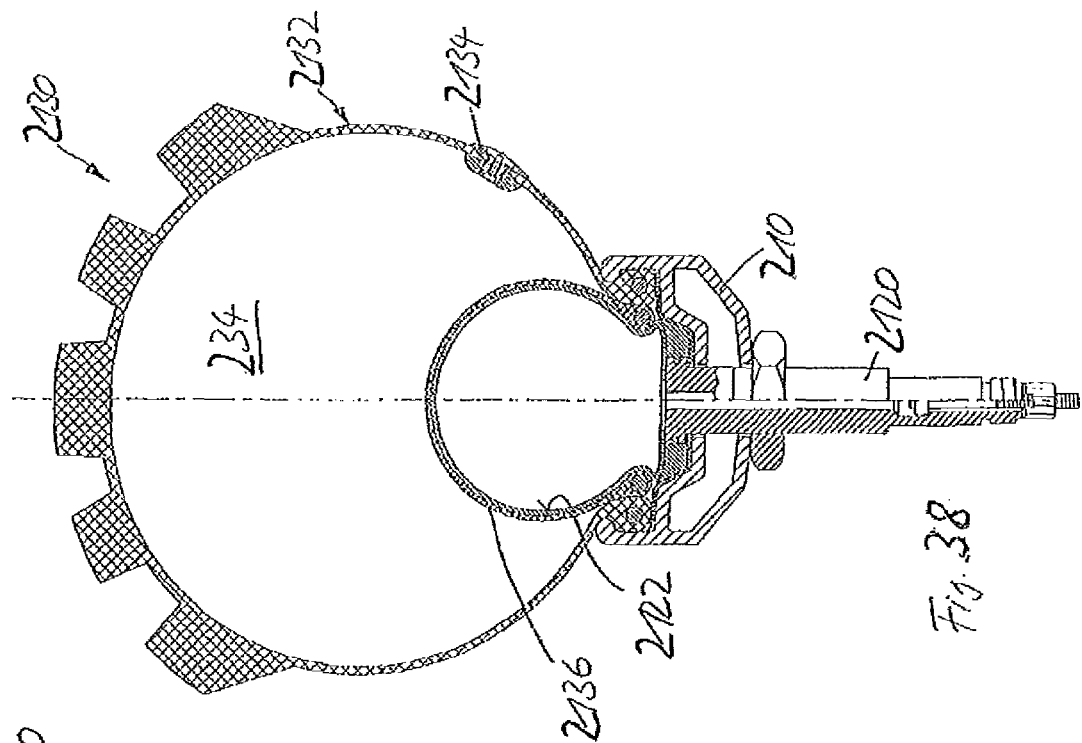
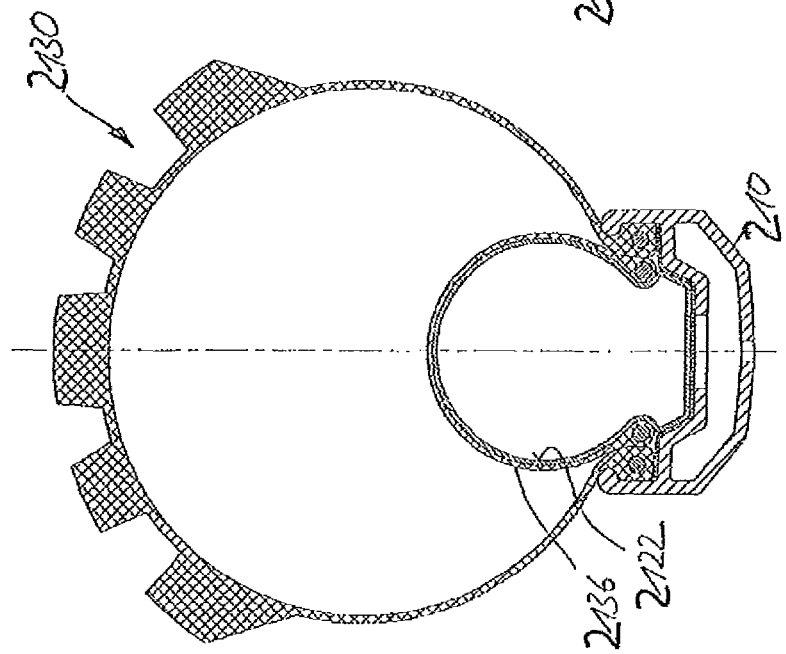

TIRE ASSEMBLY FOR A BICYCLE RIM

CROSS-REFERENCE TO RELATED APPLICATIONS

This application claims priority from German Application No. 20 2013 008 966.0, filed Oct. 1, 2013, German Application No. 20 2014 006 003.7, filed on Jul. 23, 2014, and European Application No. 14181182.8, filed Aug. 15, 2014, the disclosures of which are hereby incorporated by reference in their entirety into this application.

FIELD OF THE INVENTION

The invention relates to a tire assembly for a bicycle rim having a wheel tire (outer tire) with a tread surface and two tire beads which in the mounted condition bear on the interior side of the rim edges, and an inner tire which in the mounted condition is disposed within the wheel tire. The invention also relates to a rim for a tire assembly.

BACKGROUND OF THE INVENTION

The European patent document EP 2 173 572 B1 discloses a tire assembly for motorcycle rims including a wheel tire, an inner tire, and a tube. The tube is arranged between the inner tire and the rim, and the inner tire is pressed against the tire beads of the wheel tire by means of the tube, to secure the wheel tire on the rim. Essential is that there is sealing engagement between the exterior side of the inner tire and the interior side of the tire beads of the wheel tire, in order to seal an intermediate space between the inner tire and the wheel tire in relation to the rim. Said intermediate space is filled by means of a valve. A separate valve is provided for filling the tube. What is proposed thereby is a tire assembly having two air chambers that are mutually sealed and separated one from the other by means of the inner tire, which chambers can be filled with different air pressures.

The European patent document EP 2 110 268 B1 discloses a tire assembly for a motorcycle rim with a wheel tire, an inner tire, and a tube. The tube is arranged within the inner tire and, in the filled and mounted condition, the inner tire presses the tire beads of the wheel tire against the rim. The inner tire has sealing lips or sealing edges which are disposed on the exterior side of the inner tire and press against the interior side of the wheel tire in the vicinity of the tire beads. Thus, an air-tight connection between the inner tire and the wheel tire is produced. Thereby, the tire assembly provides two air chambers which are separated one from the other and mutually sealed by means of the inner tire as a partition wall. The second air chamber between the inner tire and the wheel tire is filled using an inflation needle, which is pierced into the wheel tire. The hole produced thereby is sealed using sealant milk.

SUMMARY OF THE INVENTION

The invention is aimed at providing a tire assembly adapted to bicycle rims which allows the use of a wheel tire with very low air pressure and yet ensures that the wheel tire is held secure on the rim.

For that aim, according to the invention, a tire assembly for a bicycle rim having a wheel tire with a tread surface and two tire beads, which in the mounted condition bear on the interior side of the rim edges, an inner tire which in the mounted condition is disposed within the wheel tire, a tube which in the mounted condition is disposed within the inner tire, valve means for filling with different air pressures, on the one hand side, the tube and, on the other hand side, an intermediate space between the rim and the wheel tire is provided, wherein the inner tire in the filled and mounted condition bears on the tire beads of the wheel tire at least in sections and presses said beads against the rim, wherein an insert part is provided which in the mounted condition forms an air duct from the valve means to the intermediate space between the rim and the wheel tire, wherein the insert part is disposed between the tube and the rim, between the inner tire and the rim, between the tube and the inner tire, and/or between the inner tire and the wheel tire.

Advantageously, the inner tire is provided with a first through opening in its wall, wherein the first through opening in the mounted condition is in communication with the intermediate space between the rim and the wheel tire, and wherein an insert part is provided which in the mounted condition is disposed between the rim and the tube, and between the tube and the inner tire, and which at least in sections forms an air duct between the rim and the tube, and between the tube and the inner tire up to the through opening in the inner tire.

The invention is based on the finding that a light-weight tire assembly suitable for bicycle rims needs an air-tight sealed rim. When the air-tight sealed rim is available as a partition wall of an air chamber to the environment, there is an option to do without a sealing engagement between the inner tire and the wheel tire. Thereby, the only function the inner tire has to fulfill is to prevent radial escape of the tube, and thus, to hold the tube on the rim, in order to press the tire beads of the wheel tire against the rim via the inner tire. However, the inner tire does not have to fulfill a sealing function, which allows configuration of the inner tire in a very lightweight design. Even mounting of the tire assembly according to the invention is facilitated, since the rim has to be in an air-tight design and sealed, respectively, and thus, during mounting, there is no need to take care of a sealing engagement between inner tire and wheel tire. Providing an insert part in connection with a through opening in the inner tire allows the provision of an air duct from a valve in the rim between the rim and the tube, then between the tube and the inner tire up to the through opening, and thus, to the interior space of the wheel tire by ways and means of a very simple structural design and even a very simple mounting procedure. The insert part is configured such that it has smoothly rounded transitions without sharp edges, so as to prevent any damage to the tube. Thereby, the invention provides a tire assembly which provides two air chambers to be filled with different air pressures, with these two air chambers, however, not being arranged consecutively, but one within the other. Specifically, a first air chamber is provided by means of the interior wall of the wheel tire and the periphery of the sealed rim. Within said air chamber, the tube forming a further air chamber that is to be filled with higher pressure is arranged. The tire assembly according to the invention can be constructed in a very light-weight manner. It is also particularly advantageous that a conventional wheel tire, that is adapted to tubeless operation, can be used. The inner tire has to be configured according to the invention. The tube can be configured in a per se conventional manner, however, care should be taken that a valve of the tube is arranged in an air-tight sealed manner in the rim. The through opening is advantageously arranged in the side flanks of the inner tire such that, during operation of the tire assembly using sealant milk, penetration of sealant milk into the through opening and the ridges of the insert part is largely prevented. The through opening is ideally arranged on the inner tire, as viewed in a sectional view of the inner tire with an imaginary clock face posed on the section of the inner tire, between two o'clock and four o'clock, and between 8 o'clock and 10 o'clock, respectively, in other words, in an angular range between plus 60 degrees of angle and 120 degrees of angle, and minus 60 degrees of angle and 120 degrees of angle, respectively.

In an advanced embodiment of the invention, the valve means have two separate valves, wherein a first valve is in communication with the interior space of the tube, and a second valve is arranged on the insert part and is in communication with the air duct formed by the insert part.

Use of two separate valves has advantages in that conventional, and thus cost-efficient, available valve stems and valve cores can be used. Use of the insert part thereby allows the provision of an air duct via which the intermediate space between the rim and the wheel tire can be filled with a comparatively low air pressure. Via the first valve, the interior space of the tube is filled with a comparatively high pressure, since the tire beads of the wheel tire are pressed against the rim and in particular against the rim edges by means of the tube and the interposed inner casing, in order to hold the wheel tire secure on the rim even in extreme riding situations, and to prevent pinch flats, as the case may be.

In an advanced embodiment of the invention, the first and the second valves each have a sealing cone made of elastic material and configured for sealing engagement with a respective through hole in the rim.

Providing a sealing cone made of elastic material allows air-tight sealed arrangement of the two valves in the rim in a very simple manner, in particular in conventional valve holes of different diameters. As the case may be, sealant milk may be used in addition. The use of a sealing cone made of elastic material has the advantage that the tire assembly can be assembled without difficulty and can also be disassembled again, since the sealing cone provides on each of the valves reliable sealing between valve and rim even upon repeated mounting and dismounting. An essential advantage of the invention in this context is that a sealing between an elastic sealing cone of the valve and the rim is substantially easier to accomplish than the sealing engagement between the inner tire and the wheel tire required with conventional systems. Owing to its shape design, the sealing cone is self-centering in the through hole so that reliable sealing can be achieved with low effort. Therein, arranging a through opening in the inner tire allows, together with the insert part, the provision of an air duct from the second valve to the intermediate space between the rim and the wheel tire in a simple manner, which air duct is not squeezed and sealed even by a tube filled at high pressure. This is of essential importance, in order to avoid the need to follow a specific sequence during filling the two air chambers of the tire assembly according to the invention. In particular, for example, the second air chamber between the rim and the wheel tire can be filled or blown off even when in use, to influence the running characteristics of the tire assembly. The tube, however, may remain filled with high pressure which is unvaried, to ensure secure fit of the wheel tire on the rim.

In an advanced embodiment of the invention, the second valve has a base plate made of elastic material extending in the circumferential direction of the tire assembly and arranged between the insert part and the tube.

Such a base plate protects the tube and allows simple arrangement of the valve on the rim, and in particular, there is no risk that the valve in the valve hole of the rim will tilt.

The tube can then rest on an exterior surface of the base plate, as viewed in the radial direction. The insert part rests on a radially interior surface of the base plate. Advantageously, an outlet hole of the second valve opens on the radially interior side of the base plate, to allow the introduction of air directly into the air duct provided by the insert part. The sealing cone advantageously extends from the radially interior side of the base plate, to seal the valve against the rim.

In an advanced embodiment of the invention, the valve means include a two-way valve, wherein a first outlet of the two-way valve is in communication with the interior space of the tube, and a second outlet of the two-way valve in the mounted condition is in communication with the air duct between the rim and the tube, and between the tube and the inner tire up to the through opening in the inner tire.

Providing a two-way valve allows reduction of weight. It is also possible to manage with one single valve hole in the rim.

In an advanced embodiment of the invention, the two-way valve is arranged on the insert part.

In this manner, a second outlet hole of the two-way valve can be directly in communication with the air duct constituted by the insert part.

In an advanced embodiment of the invention, the insert part has a brace-type design and encompasses the tube in sections.

A brace-type design of the insert part facilitates mounting thereof, since said insert part needs not more than placing around the, for example, already partially pumped up tube, in a very simple manner. Thus, when using two valves, the insert part can easily be pushed to the correct position even in the circumferential direction of the tube. The brace-type design of the insert part also allows a very thin and light design thereof. For example, the insert part is a synthetic material molded part. Advantageously, the synthetic material used, e.g., TPU (thermoplastic polyurethane), does not readily bind to the commonly used latex sealants. Thus, there is no risk that the insert part is obstructed. The material advantageously has a Shore A hardness of 75 to 95, in particular 85 Shore A hardness.

In an advanced embodiment of the invention, the insert part has a central through hole for inserting a valve and at least one trench extending from the through hole, which trench constitutes at least one section of the air duct between the tube and the inner tire up to the through opening in the inner tire.

Providing a through hole in the insert part ensures that the valve is placed correctly by simple insertion into the through hole. At least one trench in the insert part then provides an air duct or ensures that an air duct between the insert part and the tube and the inner tire, respectively, is formed, which air duct will not be obstructed or squeezed off even when filling the tube with very high air pressure.

In an advanced embodiment of the invention, the inner tire is made of air permeable fabric at least in sections.

Providing an air permeable fabric results in numerous through openings in the inner casing, which openings are constituted by the fabric per se. An essential advantage of the tire assembly according to the invention is that the inner casing does not need to form a partition wall of the air chamber in the wheel tire so that the inner tire can have a very light design and even be air permeable, for example.

In an advanced embodiment of the invention, the inner tire on its exterior side and the outer tire on its interior side have at least partially exposed carcass filaments, namely filaments of the fabric, said filaments forming the carcass of the inner tire and the wheel tire such that there is no air-tight sealing at a contact surface between wheel tire and inner tire.

An essential advantage of the invention is that there is no need to provide an air-tight sealing between inner tire and wheel tire. The material design of the interior side of the wheel tire and the exterior side of the inner tire are therefore essentially at will and thus, for example, the inner tire can be realized in a very light design in that the carcass thereof is embedded in a very low amount of elastic material or coated using a very low amount of material, respectively. Also, the side wall of the wheel tire can, indeed, have exposed carcass filaments on the interior side thereof, which filaments contribute to the fact that the inner tire and the outer tire are not in sealing engagement, what is not essential for the tire assembly according to the invention. In the extreme case, the carcass can be completely without any coating or embedding.

In an advanced embodiment of the invention, the fabric of the inner tire is connected to two circumferential tire beads, in particular is sewn, vulcanized, welded, or adhesively bonded.

The tire beads of the inner tire and the connection thereof to the fabric of the inner tire ensure that the tube disposed within the inner tire is prevented from excessive expansion in the radial direction, but rather is held on the rim and, thus, can press the tire beads of the wheel tire against the rim, specifically the rim edges, with interposition of the inner tire.

In an advanced embodiment of the invention, the tire beads of the inner tire are provided with a bead core including high tensile strength and high-modulus fibers, in particular Zylon® fibers (PBO fibers), carbon fibers, or aramid fibers, which fibers exhibit only very low elongation even at high tensile force.

Providing high tensile strength fibers in the bead cores of the inner tire ensures that the bead cores and, thus, the inner tires do not or only to a non-essential extent expand in the radial direction of the tire assembly. Even in case that the tube within the inner tire is filled with very high pressure, the tube is thereby held on the rim. Use of high tensile strength and high-modulus fibers also allows the bead cores to have a lighter design as compared to the case of using less tensile strength and high modulus fibers. Advantageously, multi-filament yarns having a very high Young's modulus are employed. For example, Zylon® fibers having a weight of 3270 dtex and a Young's modulus of 28000 $N/mm^2$ are used.

In an advanced embodiment of the invention, the inner tire includes a ply of canvas fabric (crossing filaments) and two tire beads, wherein the edges of the fabric are folded towards the interior space of the inner tire or outwards around the tire beads.

In an advanced embodiment of the invention, means for sealing between the valve and the rim, and means for sealing of spoke holes in the rim are provided.

For example, with the tire assembly according to the invention, a per se conventional rim can be used and air-tightly sealed using appropriate means. Such means can comprise, for example, sealant milk or a rim tape that is placed and/or bonded on the rim well and, thus, closes the spoke holes in the rim in an air-tight manner.

According to the invention, a bicycle rim including two valve holes is provided as well. The valve holes can be arranged closely adjoined and offset by 45° or less, in order to facilitate mounting and filling of the tire assembly. As an alternative, the valve holes are arranged offset by 180°, in order to prevent unbalance due to the valves as far as possible.

Within the scope of the invention, a tire assembly for a bicycle having a wheel tire with a tread surface and two tire beads which in the mounted condition bear on the interior side of the rim edges, having an inner tire of diagonal structure which in the mounted condition is disposed within the wheel tire on the rim, and having a tube which in the mounted condition is disposed within the inner tire, and having valve means for independently filling, on the one hand side, the tube and, on the other hand side, an intermediate space between the inner tire and the wheel tire is provided, wherein the inner tire in the filled and mounted condition bears on the tire beads of the wheel tire at least in sections and presses the beads against the rim.

By means of such an assembly including a wheel tire, an inner tire, and a tube, easy mountability and very reliable operation can be ensured. Specifically, the inner tire provides for the fact that the tube is held on the rim even in the pumped up condition and, thus, is able to produce preload force against the tire beads of the wheel tire. The tube per se can be a plain rubber or synthetic material tube without reinforcements and, thus, have a design that is cost-efficient to manufacture, however, reinforcements can be provided as well, should the intended use require such.

The valve means can include a two-way valve, wherein a first outlet of the two-way valve is in communication with the interior space of the tube and a second outlet, in the mounted condition, is in communication with the intermediate space between the inner tire and the wheel tire.

By means of such a two-way valve, using one single valve allows filling, on the one hand side, of the tube and, on the other hand side, the intermediate space between the inner tire and the wheel tire, mutually independently and specifically with completely different pressures. Specifically, the intermediate space between the inner tire and the wheel tire may be pumped up to not more than a very low pressure, in order to achieve a significantly optimized running performance of the wheel tire on a roadway. The tube within the inner tire, however, is filled with a comparatively high pressure, in order to press the tire beads of the wheel tire with high force against the rim edges, and thus, to prevent that the wheel tire may slip off the rim during operation. Furthermore, the inner tire provides pinch flat protection, and thus, prevents the wheel tire from being forced against the top of the rim when crossing a curb and, thereby, prevents damage and leaks. The two-way valve includes a conventional non-return valve which can be connected to a conventional air pump. In addition, sealant milk or another liquid sealant can be used within the wheel tire.

The inner tire can be provided with a first through opening in its wall, wherein the first through opening in the mounted condition is in communication with the intermediate space between the inner tire and the wheel tire.

By means of such a through opening, the intermediate space between the inner tire and the wheel tire can be filled via the through opening in the inner tire. Providing a through opening in the inner tire is no problem, since the inner tire is not intended for contact with a road surface, anyway, and thus, even elevations in the wall of the inner tire do not pose a problem.

The through opening can be connected to an end of a flexible tube, wherein the other end of the tube is connected to the valve means.

In this manner, a valve can be connected to the through opening in the wall of the inner tire and owing to the flexible tube, on the one hand, size variations of the inner tire during pumping up or deflating are compensated for and even movements during riding operation do not pose a problem. In particular, a lateral offset of valve and through opening can be compensated for.

The tube can be provided with a second through opening in its wall, wherein the tube at least in the vicinity of the second through opening is connected to the inner tire in the vicinity of the first through opening, and wherein the first through opening is in communication with the second through opening.

In this manner, the intermediate space between the inner tire and the wheel tire can be filled via the tube and through the inner tire. Thereby, a very compact design of the tire assembly according to the invention is obtained and the intermediate space between the inner tire and the wheel tire is fillable without any difficulty.

The first through opening and the second through opening can be connected using a sheath, wherein the sheath forms a duct through the wall of the tube and the wall of the inner tire. As already explained, elevations in the wall of the inner tire and/or the tube, which could be caused by the sheath, are not a problem, since neither the tube nor the inner tire are intended for contact with a road track surface. The sheath can be provided with a pressure reducing valve, so that between the inner pressure of the tube and the interior space of the intermediate space between the inner tire and the wheel tire a predefined pressure difference is obtained. As an alternative, the sheath can be connected to a flexible tube, which tube again leads to a valve on the rim.

The tube can have two ends, wherein both ends of the tube in the mounted condition are mutually opposite in the vicinity of the first through opening.

Such a tube with two ends is also referred to as an "open tube". Between the two ends of the tube an air duct can be provided, for example, by means of a flexible tube leading to the through opening in the inner tire and via which then the intermediate space between the inner tire and the wheel tire can be filled.

In the region where, in the mounted condition, the inner tire bears on the interior side of the tire beads of the wheel tire, the inner tire and/or the wheel tire can have at least one protrusion and/or at least one depression, wherein the protrusion and/or the depression provide an air duct during filling of the intermediate space between the interior space and the wheel tire over the region where, in the mounted condition, the inner tire bears on the interior side of the wheel tire.

Thus, by means of at least one protrusion and/or at least one depression an air duct can be provided which then allows filling of the intermediate space between the inner tire and the wheel tire from valve means arranged in the vicinity of the rim. Such protrusions and/or depressions can, for example, be ridges or grooves extending either in relation to the rim radially or angled relative to the radial direction obliquely upwards.

Only a partial section of the inner tire and/or the wheel tire can be provided with at least one protrusion and/or at least one depression.

In particular with bicycle tires, the weight of a tire assembly is a crucial parameter and should be kept as low as possible. Thus, for reasons of weight, it can be advantageous to design merely a partial section of the inner tire in such a manner that an air duct between the inner tire and the wheel tire is formed. For example, strip-type protrusions or ridges can be vulcanized onto merely a small partial portion on the exterior wall of the inner tire and/or on the interior wall of the wheel tire.

An insert part can be provided which in the mounted condition is disposed between the rim and the tube, and between the inner tire and the wheel tire, and which forms an air duct between the inner tire and the wheel tire in the region where the inner tire bears on the interior side of the wheel tire.

Such an insert part can, for example, be implemented in the form of a rim tape. Such a rim tape is formed continuously in a comparatively thick configuration and has at least in the vicinity of the valve a duct extending transversely to the circumferential direction, in order to constitute an air duct. As an alternative, the rim tape can have a thicker configuration merely in one section and be provided with the transversely extending groove or the transversely extending air duct. The insert part can also be a separate part, for example, a synthetic material part which is placed on the rim merely in the vicinity of the valve, for example, and is configured such that an air duct is formed from the valve to the intermediate space between the inner tire and the wheel tire. The insert part can be made of elastic synthetic material, rubber, or even comparatively hard synthetic material, or even be made of metal. Advantageously, a particularly light-weight material is selected and the insert part is designed in a short length, as viewed in the circumferential direction, in order to cause the least amount of additional weight as possible. Advantageously, the insert part should be in sealing in relation to the rim.

The valve means can include a valve in at least one of the side walls of the wheel tire.

Owing to the very low air pressure that is filled in the intermediate space between the inner tire and the wheel tire, for example, not more than in the range of approximately 0.5 to 1.5 bar, in particular 1 bar, a very light and compact valve can be employed which can readily also be arranged in one of the side walls of the wheel tire, without negative effect on the running characteristics of the wheel tire.

The valve can be completely made of elastic rubber material and/or synthetic material.

The inner tire can at least in sections be made of air permeable fabric.

The inner tire is mainly provided to hold the tube, which is disposed within the inner tire, on the rim, and to press the tire beads of the wheel tire against the rim edges. The inner tire per se does not have to be air-tight, since the tube disposed within the inner tire is essentially air-tight, anyway. Also, the inner tire is not intended for contact with a road surface. Thus, for weight considerations, it can be expedient to configure the inner tire at least in sections to be made of fabric which, for example, is not rubberized, and thus, is air permeable.

The fabric can be sewn, adhesively bonded, or vulcanized to two circumferential tire beads.

What can be ensured in this manner is that the inner tire holds the tube reliably on the rim even in the pumped up condition.

The inner tire can include at least one ply of fabric and two tire beads, wherein edges of the fabric are folded towards the interior space of the inner tire or outwards around the tire beads.

Such a construction of the inner tire is also referred to as turn-up construction. Such an embodiment of the inner tire allows a very light configuration of the inner tire. Nonetheless, the tire beads ensure that the tube arranged within the inner tire is reliably held on the rim.

The inner tire can be a belted tire including a diagonal carcass or a diagonal tire including a belt and can at least in the region of its largest diameter include a fabric belt.

The belt therein provides for the fact that the tube disposed within the interior space of the inner tire is held reliably on the rim. A belted tire or a diagonal tire including a belt can be substantially more shallow in relation to its height than a diagonal tire without a belt, for example, a so-called low-section tire which is wider than it is high. A low-section tire can then support the wheel tire upon severe deformation, for example, during extreme cornering or lateral impacts, essentially more and better than a diagonal tire of approximately circular cross section. Such a design of the inner tire in a belted tire or a diagonal tire including a belt, in particular a low-section tire, thus offers significant advantages during running operation of the tire assembly. The belt can be a so-called zero degree belt, that is, include filaments extending merely in the circumferential direction. As an alternative, the belt can be a so-called zero degree/ninety degree belt or a belt made of canvas fabric in that the belt, on the one hand side, has filaments extending in the circumferential direction and, on the other hand side, has filaments oriented transversely thereto, perpendicular to the circumferential direction.

The tube can be made of thermoplastic polyurethane (TPU).

Producing the tube from thermoplastic polyurethane allows production of very light-weight tubes, which in particular are essentially more light-weight and more stable than rubber tubes.

The tube can have a bottom side which in the mounted condition rests on the rim or on a rim tape, wherein the bottom side has at least one protrusion and/or at least one depression, wherein in the mounted condition by means of the at least protrusion and/or by means of the at least one depression an air duct is formed between the rim and the bottom side of the tube.

In this manner, an air duct can be formed using the tube as such, which air duct is then needed for filling the intermediate space between the inner tire and the wheel tire.

The inner tire can be connected to the wheel tire in the region of the tire beads of the wheel tire.

In this manner, the inner tire and the wheel tire can already be fixed to one another in the proper position. For example, it is also possible that the inner tire is then designed without tire beads, since it is connected to the tire beads of the wheel tire anyway. Connection of the inner tire to the wheel tire can, for example, be by sewing, adhesive bonding, and/or vulcanizing. As an alternative, the wheel tire can be designed without a bead core and be connected to the inner tire.

In the mounted condition, a rim tape can be provided between the rim and the tube, wherein the rim tape includes at least one groove extending obliquely or transversely to the longitudinal extension thereof and/or at least one protrusion extending obliquely or transversely to the longitudinal extension thereof, wherein the at least one groove and/or the at least one protrusion forms an air duct between the rim tape and the tube in the mounted condition.

Using such a specific rim tape allows for the provision of an air duct for filling the interior space between inner tire and wheel tire. Therein, the rim tape can be thicker and include the groove merely in the valve region. When using such a rim tape, a conventional tube of essentially constant wall thickness can be used.

There can be sealing means provided between valve and rim and for sealing the spoke holes of the rim.

A sealing between valve and rim, or between multiple valves and the rim is required when an air duct passes from the valve up to the intermediate space between the inner tire and the wheel tire. Covering and sealing the other spoke holes is required, in order to prevent the tube from pressing into the spoke holes due to the inner pressure and to prevent the wheel tire from be leaking air. Therein, the sealing means can, for example, include a conventional annular seal between a seal flange of the valve and the rim. Furthermore, the sealing means can be a reinforced and thicker bottom side of the tube, or even be a circumferential rim tape which is arranged between the rim and the tube, and also between the rim and a seal flange of the valve. The valve can also be sealingly embedded in a somewhat thicker portion of the rim tape. The seal between valve and rim can, for example, also be provided by an insert part which, on the one hand seals the valve towards the rim and, on the other hand, provides an air duct into the intermediate space between the interior space and the wheel tire.

Within the scope of the invention, the inner tire and the tube can also be implemented as a so-called tubed tire, wherein the tube is accommodated within the equally toroid and, where required, sewn up inner tire. For the purpose of the invention, the inner tire does not have to include a running tread or tread surface, and thus can have a very light configuration, for example, a rubberized carcass. The inner tire can be produced based on a usual tubed tire and has to include at least one pressure-resistant textile ply. The tube can be a butyl tube, as the case may be, a TPU tube. The tube can be filled with very high pressure, in particular between 6 bar and 15 bar, and thereby holds the wheel tire secure on the rim, wherein the intermediate space between the rim and the wheel tire can then be filled with a low air pressure, in particular between 3 bar and 6 bar. On the rim, said tubed tire, which combines the tube and the inner tire, is held by its own contact pressure. Adhesive bonding of said tubed tire to the rim is not required. The wheel tire has to be adapted to tubeless operation.

The insert part can be arranged either within the tubed tire between the tube and the inner tire, or between the tubed tire and the wheel tire, that is, between the inner tire and the wheel tire. In the first case, the inner tire either has to be air permeable or be provided with a through opening in its wall. Therein, the through opening is disposed in the overlapping of the reinforcement ply, that is, the textile ply of the inner tire.

There may be one two-way valve or two one-way valves employed. The rim has to be air-tight, or there are means provided for sealing the rim, in particular seal cones on the valve for sealing the valve holes and, for example, a rim tape for sealing the spoke holes.

Even with a combination of the inner tire and the tube to a tubed tire there are advantages obtained according to the invention, namely, that the inner tire holds the wheel tire secure on the rim, and thereby, the wheel tire can be run with comparatively low pressures. Furthermore, emergency running properties are extremely good, since the wheel tire does not slip off the rim even upon complete loss of air. The invention also offers reliable protection against pinching or bumping on the rim edges. By combining the inner tire and the tube to a tubed tire, the invention can predominantly be used for wide-base racing bicycle tires or cross tires.

BRIEF DESCRIPTION OF THE DRAWINGS

Further features and advantages of the invention will become apparent from the claims and the following description of preferred embodiments of the invention in connection with the drawings. Individual features of the different, illustrated embodiments can be combined in arbitrary manner, without passing beyond the scope of the invention.

FIGS. 4 to 8 several views of an insert part of the tire assembly according to the invention of FIG. 1;

FIGS. 9 to 11 several views of a first valve of a tire assembly according to the invention;

FIGS. 16 to 21 several views of a first valve of a tire assembly according to the invention according to another embodiment;

FIG. 22 a sectional view of a bicycle rim with a tire assembly according to the invention according to another embodiment, wherein a valve is merely partially sectioned;

FIG. 23 another sectional view of the bicycle rim with the tire assembly according to the invention of FIG. 22, wherein the sectional plane is herein remote from the valve;

FIG. 26 a sectional view of a bicycle rim with a tire assembly according to the invention according to another embodiment in the valve region;

FIG. 27 a further sectional view of the bicycle rim with the tire assembly according to the invention of FIG. 26 remote from the valve region;

FIG. 30 a sectional view of a bicycle rim with a tire assembly according to the invention according to another embodiment in the region of a first valve;

FIG. 31 a further sectional view of the bicycle rim with the tire assembly of FIG. 30 in the region of a second valve;

FIG. 32 a sectional view of the bicycle rim with the tire assembly of FIG. 30 remote from the region of the first and the second valve, respectively;

FIG. 38 a sectional view of a bicycle rim with a tire assembly according to the invention according to another embodiment in the valve region;

FIG. 39 a sectional view of the bicycle rim with the tire assembly of FIG. 38 in a region remote from the valve;

DETAILED DESCRIPTION

Figure 1:
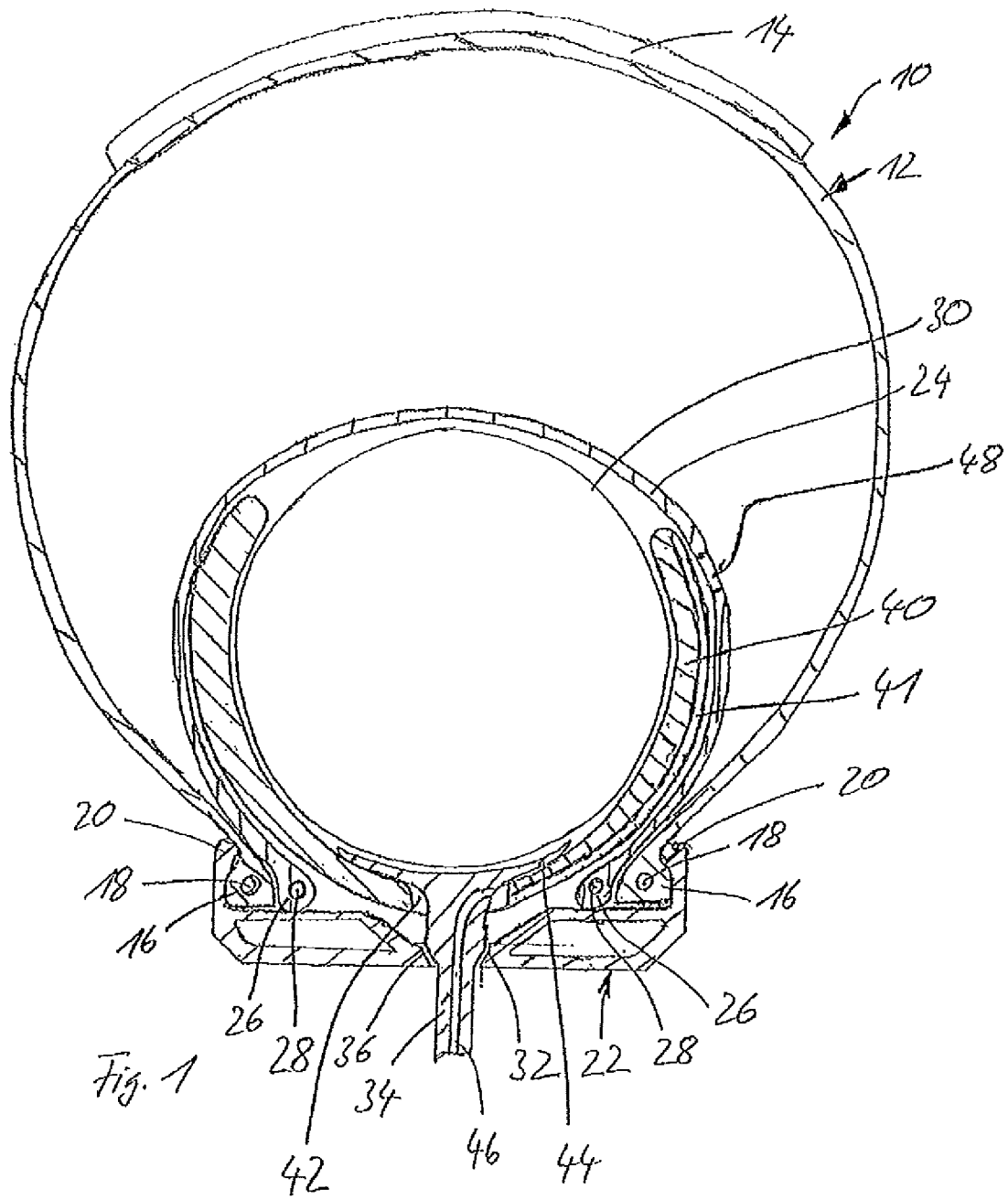
FIG. 1 a diagrammatic sectional view of a tire assembly according to the invention.

The illustration of FIG. 1 shows in a diagrammatic sectional view a tire assembly 10 according to the invention, comprising a wheel tire 12 which has a running tread or tread surface 14 and two tire beads 16. Each of the tire beads 16 is provided with a bead core 18. The tire beads 16 of the wheel tire 12 bear on the interior sides of the rim edges 20 of a rim 22. The rim 22 per se is air-tight, in a manner not illustrated, meaning that the (not illustrated) spoke holes in the rim 22 are sealed to be air-tight, for example, by placing on or adhesively bonding of a rim tape (not illustrated in FIG. 1) onto the rim well of the rim 22, where the bottom sides of the beads 16 of the wheel tire 12 are resting as well.

The tire assembly 10 according to the invention further includes an inner tire 24 which is disposed within the wheel tire 12 and equally has two tire beads 26, each with a bead core 28. The bottom sides of the beads 26 of the inner tire 24 bear on the rim well of the rim 22 and the exterior sides thereof bear on the interior side of the tire beads 16 of the wheel tire 12. It is noted in this context that the illustration of FIG. 1 is a diagrammatic view. Illustrated is a minor intermediate space between the exterior side of the inner tire 24 and the interior side of the wheel tire 12, which space is not present in reality. This is to elucidate that the inner tire 24, indeed, does press the tire beads 16 of the wheel tire 12 in FIG. 1 to the left hand side and the right hand side, respectively, against the interior side of the rim edges 20 of the rim 22, but that there is no sealing engagement existent between the exterior side of the inner tire 24 and the interior side of the wheel tire 12.

Within the inner tire 24 is disposed a tube 30 which can be filled with air using a valve (not illustrated in FIG. 1). The tube 30 is made of elastic material. When the tube 30 is filled with air, it expands essentially on all sides and also tends to increase its diameter. This is prevented by the inner tire 24 which holds the tube 30 in the position as illustrated in FIG. 1, that is, essentially on the rim 22. To that end, the bead cores 28 of the inner tire 24 are made of high tensile strength and high modulus fibers, for example, Zylon® fibers (poly (p-phenylene-2,6-benzobisoxazole), PBO).

The sectional plane of FIG. 1 is across a location on the rim 22 where the rim 22 has a valve hole 32 for a second valve 34 which is not intended for filling the tube 30, but provided for filling an intermediate space between the rim 22 and the wheel tire 12. Essential for the purposes of the invention is that the valve 34 is received in the valve hole 32 of the rim 22 in an air-tight manner. Therefore, the valve 34 is provided with a sealing cone 36 made of elastic material, indicated only schematically in FIG. 1, which cone is pressed downwards, in FIG. 1, against the equally conical valve hole 32 of the rim 22 by the inner pressure of the tube 30 and, thus, provides an air-tight sealing.

An insert part 40 is provided between the inner tire 24 and the tube 30, which insert has a brace-type design including a pair of substantially opposed portions 41a and 41b (FIG. 4) and encompasses the tube 30 in sections. The insert part 40, in the sectional view of FIG. 1, has the shape of a partially cut open circular cylinder so that it can embrace the tube 30 and is also conforming to the circular type cross sectional shape of the inner tire 24. The insert part 40 has a central through hole 42 where the valve 34 is inserted. A base plate 44 of the valve 34 is then located between the insert part 40 and the tube 30. An outlet hole 46 of the valve 32 issues in the through hole 42. Starting from the through hole 42, a plurality of trenches 41 are provided in the insert part 40, the trenches then constituting an air duct between the insert part and the tube 30. The trenches 41 are designed to such a depth that even when filling the tube 30 with very high pressure, the trenches 41 are not completely obstructed or sealed. The trenches 41 extend up to the free end of the insert part 40, on the right hand side in FIG. 1. In the region of the insert part 40, a through opening 48 is provided in the inner tire 24, wherein the region of the through opening 48 should bear on the insert part 40. An air duct for filling an intermediate space between the rim 22 and the wheel tire 12, thus, leads from the outlet hole 46 of the valve 32 via the through opening 42 in the insert part 40, through the trenches 41 in the insert part 40, and finally through the through opening 48 in the inner tire 24. The through opening 48 can have a diameter from 2 mm to 8 mm, preferred is 5 mm. Openings which are too small can be closed using sealant milk, openings which are too large impair the structure of the inner tire. Besides the air duct as described, the air may also enter from the through opening 42 into the space between the insert part 40 and the rim 22 and then pass, for example, between the inner tire 24 and the wheel tire 12 into the region located above the inner tire 24. In that context, it is essential to note that the air chamber is formed between the rim 22 and the wheel tire 12. Thus, even the region located between the insert part and the rim 22 in FIG. 1 is filled with the air pressure, which pressure is also applied within the wheel tire. The tube 30 which forms another air chamber is disposed within the air chamber as described and is enclosed by said chamber.

It is intended for riding operation, to fill the tube 30 with a comparatively high air pressure, for example, 6 bar. The tube 30 is then held on the rim 22 by the inner tire 24. In this regard, it should be noted that FIG. 1 is a diagrammatic view and in the pumped up condition the intermediate spaces between the individual components are no longer present or essentially smaller. By means of the tube 30, a pressure is exerted onto the tire beads 26 of the inner tire, acting also towards the left hand side and the right hand side, respectively, in FIG. 1. Said pressure is transferred via the tire beads 26 of the inner tire 24 to the tire beads 16 of the wheel tire 12 so that said beads are pressed against the rim edges 20 of the rim 22. By filling the tube 30 with high pressure, it is thus ensured that the tire beads 16 of the wheel tire 12 are reliably secured on the rim 22.

This allows filling of the air chamber formed between the rim 22 and the wheel tire 12 via the valve 34 with not more than very low pressure. Very advantageous riding characteristics may be achieved thereby. As explained, even in extreme riding situations, there is no risk that the tire beads 16 of the wheel tire 12 slip off the rim 22. Even a temporary disconnection of the tire beads 16 from the rim 22 and resultant air loss is prevented. Furthermore, as evident from FIG. 1, pinching of the wheel tire 12 onto the top faces of the rim edges 20 with potential damage and air loss is prevented. Thereby as well, filling of the air chamber between rim 22 and wheel tire 12 with not more than very low air pressure, for example, 0.8 bar is allowed.

Figure 2:
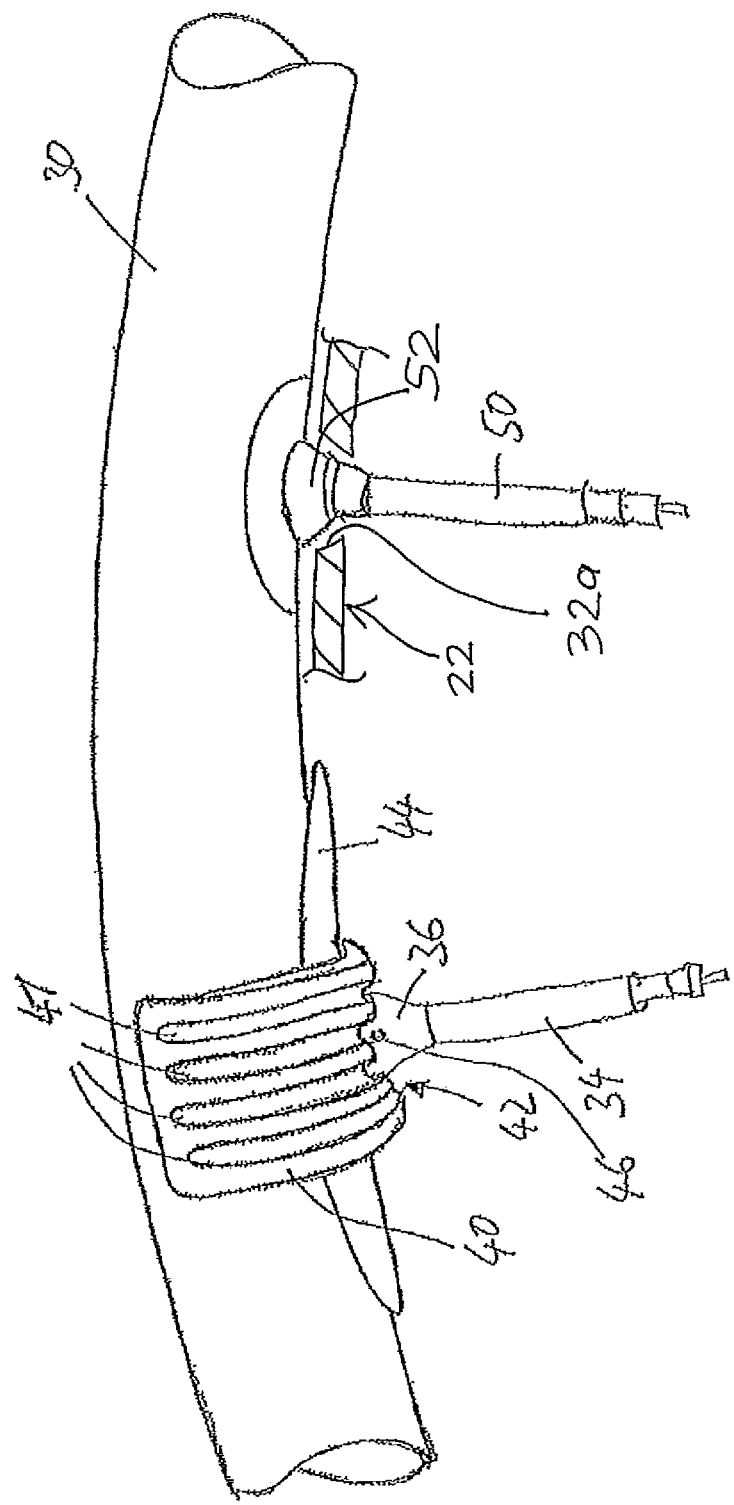
FIG. 2 a diagrammatic side view of sections of the tire assembly of FIG. 1 in a partially mounted condition and in a diagrammatic illustration.

The illustration of FIG. 2 shows a diagrammatic view of a section of the tube 30 in the tire assembly according to FIG. 1. The tube 30 is provided with a valve which is connected to the tube 30 and intended for filling said tube. At the transition from the valve 50 to the tube 30 is provided a sealing cone 52 made of elastic material to seal the valve 50 in relation to the rim (not 22, which rim 22 includes a further valve hole 32a for receiving the valve 50.

Furthermore, FIG. 2 illustrates the second valve 34 which, as explained, includes the sealing cone 36 made of elastic material which provides for sealing in relation to the rim. The valve 34 is provided with a base plate 44 and inserted into the through hole 42 of the insert part 40 from above in FIG. 2. Clearly visible in FIG. 2 are the multiple trenches 41 of the insert part 40 which trenches, as explained above, constitute at least one air duct between the tube 30 and the insert part 40.

Figure 3:
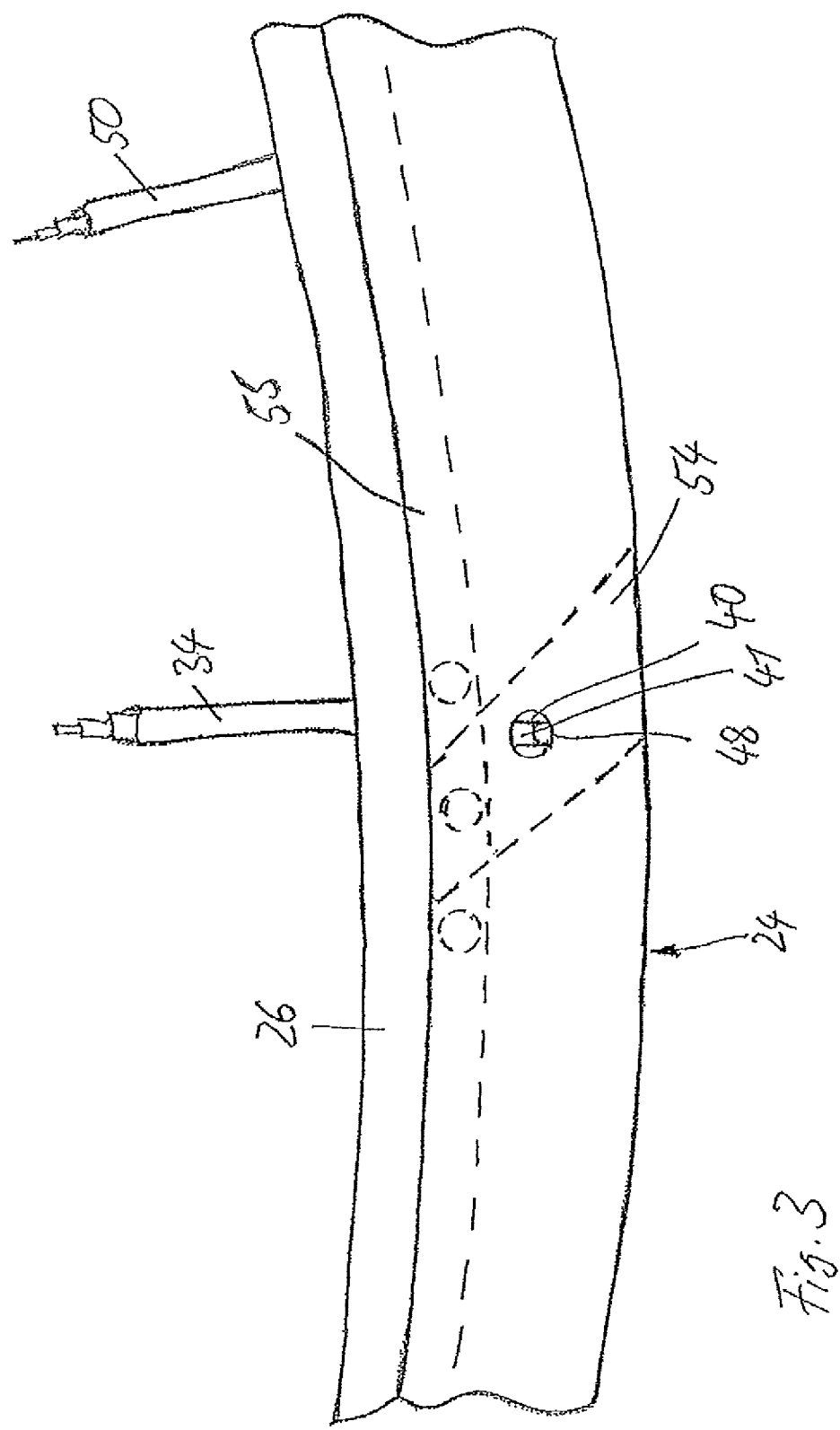
FIG. 3 another diagrammatic side view of sections of the tire assembly according to the invention of FIG. 1 in a partially mounted condition.

The illustration of FIG. 3 shows in sections the tire assembly according to the invention of FIG. 1 and FIG. 2, wherein the inner tire 24 is additionally illustrated. Thus, the tube 30 is no longer apparent in the illustration of FIG. 3, merely the valve 50 is illustrated. Furthermore illustrated is the valve 34, which is inserted in the through opening of the insert part 40, cf. FIG. 2, wherein the insert part 40 in the illustration of FIG. 3 is visible through the through opening 48 in the inner tire 24. Also apparent through the through opening 48 in FIG. 3 is one of the trenches 41 in the insert part 40.

The through opening 48 is disposed in a region 54 of the inner tire 24 in which the fabric plies of the carcass of the inner tire 24 are overlapping. The region 54 is indicated by dashed lines. In this region, the fabric of the inner tire 24 is in a two-ply arrangement and, thus, substantially more stable so that the through opening 48 can be driven into the inner tire 24 without a risk of damaging the tire when the tube 30 is pumped up to a very high pressure. In the region 55 above the tire beads, indicated in dashed lines, the fabric is also at least in a two-ply arrangement and the through opening could be disposed in said region. Possible positions of the through opening are indicated in dashed lines. The illustration of FIG. 4 shows a front view of the insert part 40. The insert part 40 is a synthetic material molded part and in FIG. 4 the brace-type design of the insert part 40 is clearly visible.

FIG. 5 shows a view of the sectional plane B-B in FIG. 4. Apparent is the through opening 42 in the insert part 40 and the trenches 41 disposed only on one leg of the insert part. The trenches 41 can also be provided on both legs to facilitate handling of the insert part 40. The through opening 42 is significantly larger than the base of the valve 34, cf. FIG. 1, since the air is, indeed, to flow out of the outlet 46 and then partially to enter into the trenches 41.

FIG. 6 shows a top view on the insert part 40. The transition between the through opening 42 and the two central trenches 41 is rounded, in order to facilitate passage of air.

FIG. 7 shows another side view and FIG. 8 shows a top view.

FIG. 9 shows a partially sectional view of a first valve of the tire assembly according to the invention which is provided for filling the tube 30, cf. FIG. 11. The valve 50 has a base plate 51 which is connected to the tube 30. A sealing cone 52 is integral with the base plate 51 and is arranged for sealing the valve 50 in relation to the rim. The base plate 51 has a central opening through which the tube 30 is filled. FIG. 10 shows a top view on the valve 50 and FIG. 11 shows a side view of the tube 30 with the valve 50 in sections.

Figure 12:
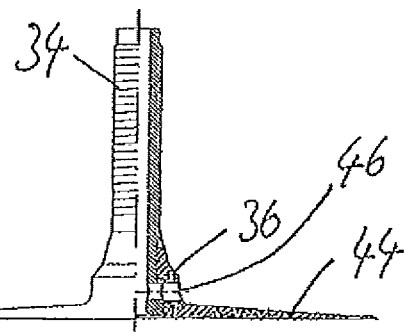
FIGS. 12 and 13 several views of a second valve of a tire assembly according to the invention.
Figure 13:
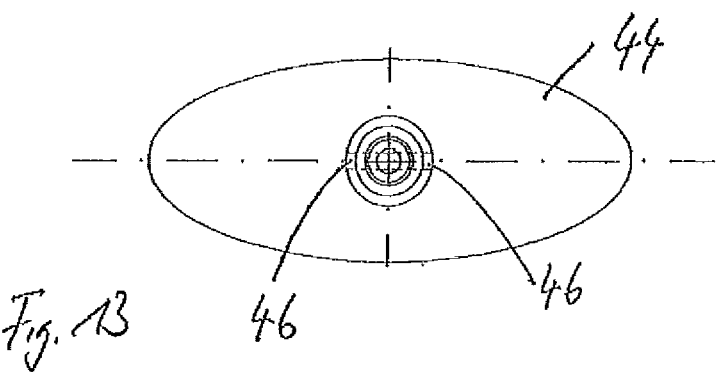
Figure 14:
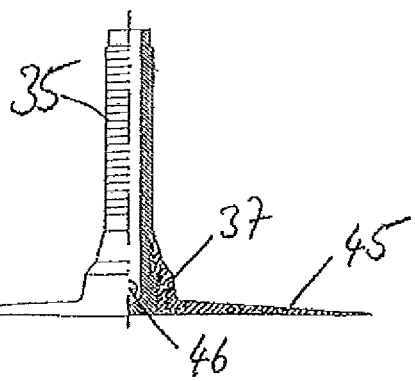
FIGS. 14 and 15 several views of a second valve of the tire assembly according to the invention according to a second embodiment.
Figure 15:
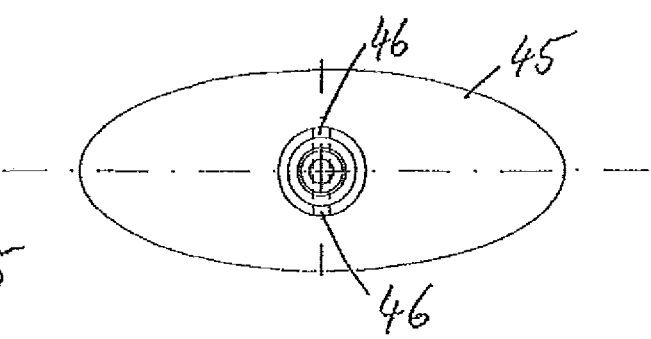

FIG. 12 shows a partially sectional side view of a first embodiment of the second valve 34. As explained above, the valve 34 has a base plate 44 which is connected to the sealing cone 36 in one piece. The outlet 46 of the valve 34 issues on opposite sides of the sealing cone 36 parallel to a longer semi-axis of the elliptical base plate 44, cf. FIG. 13. FIG. 14 shows a second embodiment of the second valve 35, wherein a sealing cone 37 is as well integral to the base plate 45, but wherein the outlet 46 issues parallel to the shorter semi-axis of the equally elliptical base plate 45.

FIG. 16 shows an embodiment of a first valve 60 which is provided for connection to the tube 30. The valve 60 has a base plate 62 which, however, is not integral to a sealing cone 64 illustrated in a sectional view in FIG. 18. In fact, the sealing cone 64, cf. FIG. 19, is put onto the valve 60 from above and then rests with its underside on the base plate 62. The separate configuration of sealing cone 64 and valve 60 and base plate 62, respectively, allows optimization of the material of the sealing cone 64 in terms of good sealing effect. In contrast, the material of the base plate 62 can be optimized in terms of good vulcanization to the tube 30. Evidently, it is possible to provide even the second valve, which is not to be connected to the tube 30, with a separate sealing cone 64. The advantages herein are similar to those explained above.

FIG. 20 shows an enlarged illustration of a detail of the valve 60 according to FIG. 19, wherein the junction of the base plate 62 to the metallic base body 64 of the valve 60 and also the junction of the sealing cone 64, on the one hand side, to the metallic base body 64 and, on the other hand side, to the base plate 62 is well apparent.

FIGS. 17 and 21 respectively show top views of the valve 60; FIG. 17 a top view on valve 60 according to FIG. 16 yet without the sealing cone 64, and FIG. 21 on the valve according to FIG. 19 with the sealing cone 64.

In the sectional view of FIG. 22 is shown a bicycle rim 210 provided with a tire assembly 212 according to the invention. The tire assembly 212 includes a wheel tire 214 with a tread surface 216 which can be provided with a profile. Furthermore, the wheel tire 214 has a carcass 218 which has a generally U-shaped cross section and has tire beads 220, 222 in the vicinity of each of its free ends. The tire beads 220, 222 have circumferential bead cores 224, 226 which can be composed of wire or very strong synthetic material fibers, for example. The wheel tire 214 is essentially of conventional design, for example, like a conventional or tubeless bicycle tire. In case a conventional bicycle tire is used, the use of sealant milk can be required.

Furthermore, the tire assembly 212 includes an inner tire 228. The inner tire 228, similar to the wheel tire 214, is provided with two tire beads 230, 232, each thereof being provided with reinforcement cores. An intermediate space 234 is defined between an exterior surface of the inner tire 228 and an interior surface of the wheel tire 214, which space is filled with a first, low air pressure, for example, in the range of 1 bar.

Within the inner tire 228 is provided a tube 233 which in the illustrated pumped up condition bears tightly on the interior side of the inner tire 228. The tube 233 consists of elastic material, for example, synthetic material or rubber, and is not provided with fabric reinforcements, in contrast to the wheel tire 218 and the inner tire 228. A bottom side of the tube 233, resting on the rim well, is configured to have an increased thickness and/or be made of stronger material, as compared to the remaining wall of the tube 233. A two-way valve 238 is inserted in said bottom side. Therein, the bottom side 236 of increased thickness can be provided only in the valve region; in the embodiment as illustrated, cf. FIG. 23, the bottom side 236 is designed to have an increased thickness over the entire circumference of the rim 210 as compared to the remaining wall. The two-way valve 238 has a valve housing 240 which has a tubular configuration and is vulcanized, adhesively bonded, or screwed into the bottom side 236 of the tube 233. A portion of the valve body 238 protrudes into the interior space of the tube 233 and is provided with a plurality of through openings 242. Via the through openings 242, the interior space of the tube 233 can be filled. The upper end of the valve body 238 should not project beyond the tops of the rim edges, so as to prevent damage of the valve body 238 in case of a complete pinch of the wheel tire 218 down to the rim edges.

The valve housing 240 of the two-way valve 238 includes at least two further radially extending outlet openings 244 which provide a communication between the interior space of the valve body 240 and an intermediate space between the bottom side 236 of the tube 233 and the rim well of the rim 210. In the region where the through openings 244 issue, the bottom side 236 is provided with a groove 246 extending transversely to the circumferential direction of the rim 210 and the tube 233, forming an air duct from a respective through opening 244 of the valve body 238 up to the tire beads 230, 232 of the inner tire 228.

In the position as illustrated in FIG. 22, the two-way valve 238 is closed and, thus, there is no way for air to escape from the tube 233 through the openings 242 or from the air duct 246 through the through openings 244.

When a valve body 248 is displaced upwards from the position as illustrated in FIG. 22, then a communication between the transverse duct 250 in the valve body 248 and the through openings 242 is produced. In this position, the interior space of the tube 233 can be pumped up, pressure can be checked, and air can be blown off.

When the valve body 248 is retracted from the position as illustrated in FIG. 22, downwards in FIG. 22, as far as to align one transverse duct 250 or a plurality of transverse ducts 250 with the through openings 244 in the valve housing 238, then air can be pumped into the air duct 246 and from there on into the intermediate space 234 between the inner tire 228 and the wheel tire 218 or be blown off from said intermediate space 234.

In the lower region of the valve housing, a conventional non-return valve is provided, as illustrated in FIG. 22.

In order to continue the air duct 246 also in a region where the exterior side of the tire beads 230, 232 of the inner tire 228 bear on the interior sides of the tire beads 220, 222 of the wheel tire 214, the inner tire is provided with a plurality of ridges 252 on its exterior surface, wherein an air duct is formed between in each case two such ridges to continue the air duct 246 in the bottom side 236 of the tube 233.

Typically, the tube 233 of the tire assembly according to the invention is filled via the two-way valve 238 with a comparatively high pressure, for example, 6 to 8 bar. This is to ensure that the tire beads 230, 232 of the inner tire 228 are pressed outwards with high force, in FIG. 22 to the left hand side and the right hand side, respectively, and thereby, the tire beads 220, 222 of the wheel tire 214 are as well pressed outwards against the rim edges of the rim 210. This is to ensure that the tire beads 220, 222 of the wheel tire 214 do not disconnect from the rim edges of the rim 210. Such a preload force on the tire beads 222, 220 of the wheel tire 214 allows filling of the intermediate space 234 between the inner tire 228 and the wheel tire 214 with not more than a very low pressure, for example, in the range of 1 bar. Thereby, the wheel tire 214 can provide a very high traction without a risk that the tire beads 220, 222 disconnect from the rim 210 upon occurrence of the severe deformation to be expected of the wheel tire 214.

Furthermore, the inner tire 228 offers high protection against a so-called pinch flat of the wheel tire 214. In case the tread surface 216 of the wheel tire 214 is urged severely inwards in the direction towards the rim 210, for example, when passing a curb, then said movement is stopped at the latest when the interior side of the wheel tire 214 bears on the top side of the inner tire 228 below the tread surface 216. With the tire assembly 212 according to the invention, it is thus prevented that the interior side of the wheel tire 214 pinches onto the top sides of the rim edges and, as a result, suffers damage and pressure loss.

The illustration of FIG. 23 shows another sectional view of the tire assembly 212 according to the invention on the bicycle rim 210. Therein, FIG. 23 shows a section in a region remote from the valve 238. Apparent are an internal spoke hole 254 and an external spoke hole 256 in the rim 210. Furthermore is apparent that the bottom side 236 of the tube 233, in the regions remote from the valve 238, are not provided with transversely extending grooves. As a consequence, there are no air ducts 246 between the rim 210 and the bottom side 236 of the tube 233 formed remote from the valve 238, since such ducts are not required in said region anyway. Thus, the bottom side 236 can have less thickness in the regions remote from the valve 238 than in the region of the valve 238, but nonetheless, be strong enough for the occurring pressure load. A reduction in weight can be obtained thereby.

As apparent from FIG. 23, in the regions remote from the valve 238, the inner tire 228 also is not provided with the ridges 252. Beyond the region of the valve 238, the ridges 252 are not required, since beyond the region of the valve 238, there is in fact no need to provide an air duct between the tire beads 230, 232 of the inner tire 228 and the tire beads 220, 222 of the wheel tire 214. Here as well, a reduction in weight can be obtained.

Figure 24:
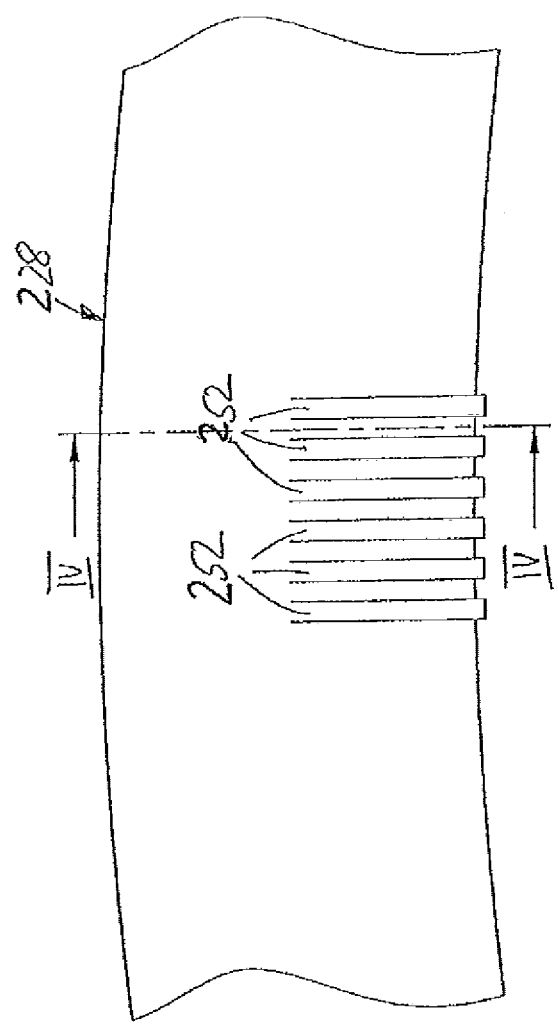
FIG. 24 a diagrammatic side view of sections of the inner tire of the tire assembly according to FIG. 22.

The illustration of FIG. 24 shows a diagrammatic side view of the inner tire 228 on the tire assembly 212 according to FIG. 22. There are a total of six ridges 252 arranged in juxtaposition spaced at equal intervals in the circumferential direction of the inner tire 228. The ridges 252 are as wide as the intermediate spaces between the ridges 252, as viewed in the circumferential direction. Since the inner tire 228 and also the wheel tire 214 are elastic, this ensures that an air duct is formed between in each case two ridges 252, in order to allow filling of the intermediate space 234 between the inner tire 228 and the wheel tire 214, cf. FIG. 22. Therein, the intermediate spaces between the ridges 252 can have a different width than the air duct 246 in the bottom side of the tube 233, to ensure a passage to the interior space 234.

Figure 25:
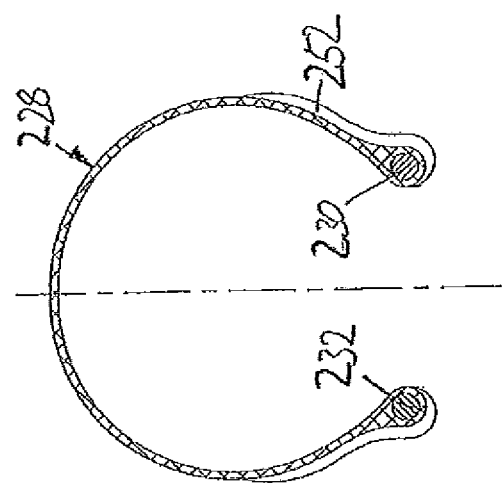
FIG. 25 a view on the sectional plane IV-IV in FIG. 24.

The illustration of FIG. 25 shows a sectional view on the sectional plane IV-IV in FIG. 24. Apparent is the configuration of the ridges 252 extending from the facing regions of the tire beads 230, 232 and then increasing in height up to approximately half the height of the side wall of the inner tire 228 where they gradually pass over again to the exterior surface of the inner tire 228. Such a configuration of the ridges 252 is reliable to provide an air duct between the inner tire 228 and the wheel tire 214, cf. FIG. 22.

The illustration of FIG. 26 shows a tire assembly 262 according to another embodiment of the invention on a bicycle rim 210. The following is a description of merely the differences to the embodiment of the tire assembly 212 in FIG. 22.

In contrast to the inner tire 228 according to FIG. 22, the inner tire 264 of the tire assembly 262 of FIG. 26 is not provided with ridges 252. The tube 266 also has a bottom side 268 which has a constant thickness essentially over the entire circumference of the tube 266. In order to provide an air duct between the rim 210 and the bottom side 268 of the tube, an insert part 270, for example, made of synthetic material is included. The insert part 270 has an end-to-end groove and thereby constitutes an air duct 272 between the bottom side 268 of the tube 266 and the rim 210. The insert part 270 is generally U-shaped and also has a through opening for the two-way valve 238. The through openings 244 of the two-way valve 238 are ending in the air duct 272 which is formed by the insert part 270. Therein, the insert part 270 extends up to the intermediate space 234 between the wheel tire 214 and the inner tire 264. Therefore, the insert part 270 has two legs 270a and 270b, which are arranged between the tire beads of the wheel tire 214 and the tire beads of the inner tire 264. In the illustration of FIG. 26 the insert part 270 has merely one air duct 272. A mirror-inverted air duct can be disposed also on the right hand side of the insert part 270 in FIG. 26 in the same manner.

The illustration of FIG. 27 shows a section through the tire assembly 262 remote from the valve 238. The insert part 270 extends over not more than a short circumferential length. At a distance from the insert part 270, the bottom side 268 of the tube 266 bears directly on the rim 210 and seals in relation to the rim. Also the tire beads of the inner tire 264 bear flat on the interior sides of the tire beads of the wheel tire 214.

Figure 28:
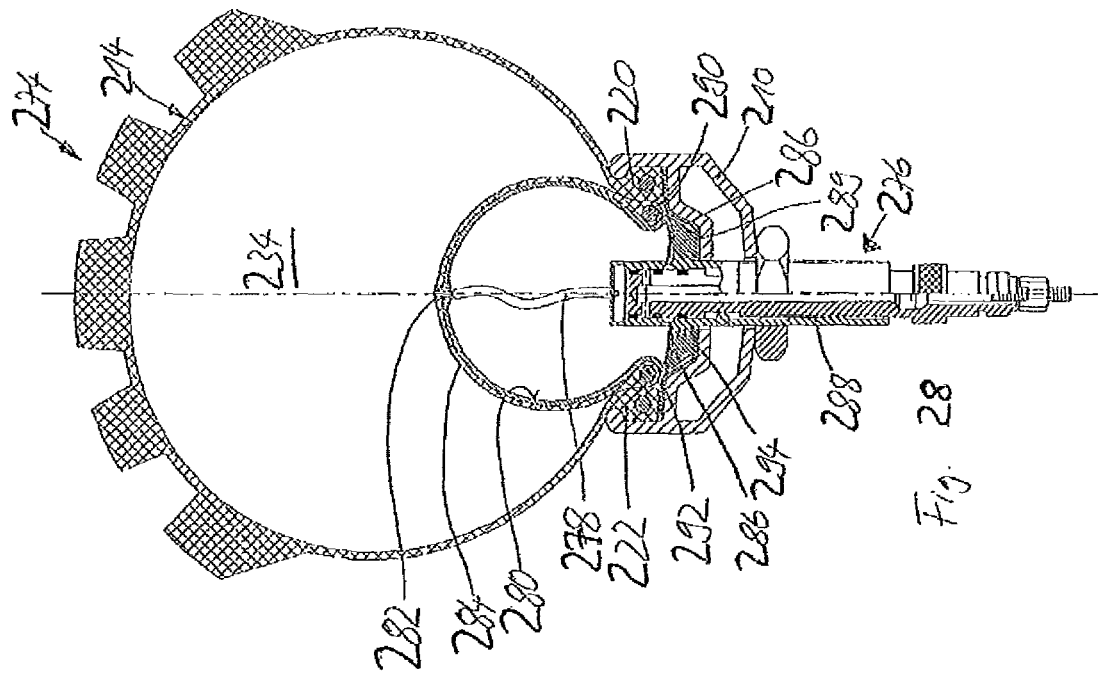
FIG. 28 a sectional view of a bicycle rim with a tire assembly according to the invention according to another embodiment in the valve region.

The illustration of FIG. 28 shows a sectional view of a further tire assembly 274 according to the invention on a bicycle rim 210. Again, just the differences in comparison to the tire assembly 212 of FIG. 22 are explained.

The tire assembly 274 includes a two-way valve 276 wherein, although in principle designed similar to the two-way valve 238 of FIG. 22, however, the upper outlet opening in FIG. 28 is connected to a flexible tube 278 which traverses a tube 280 and is connected to a sheath 282 with its end opposite to the two-way valve 276. The sheath 282 penetrates both the wall of the tube 280 and the wall of an inner tire 284. The sheath 282 has a through hole and thereby forms a duct through the wall of the tube 280 which is disposed in the interior space of the inner tire 284 and passes through the wall of the inner tire 284.

Via the flexible tube 278 and the sheath 282 the intermediate space 234 between the wheel tire 214 and the inner tire 284 can be filled. In a second position of the two-way valve 276, the tube 280 may then be filled via the through openings 286 in a valve housing 288. The tube 280 is provided with a valve base or a valve reinforcement 289 on which the two-way valve 276 is attached.

Thus, the tire assembly 274 of FIG. 28 can do without air ducts of the rim and the valve reinforcement 289 and also without air ducts between the tire beads 220, 222 of the wheel tire 214 and the tire beads 290, 292 of the inner tire 284. Instead, by means of the flexible tube 278 and the sheath 282 an air duct from the valve housing 288 through the wall of the tube 280 and through the wall of the inner tire 284 to the intermediate space 234 is provided. The interior space 234 can, thus, be filled independent of the tube 280. Specifically, the tube 280 can be pumped up to a high pressure, for example, approximately 6 bar to 8 bar, and the interior space 234 to a low pressure, for example, merely 0.5 bar to 1 bar.

Figure 29:
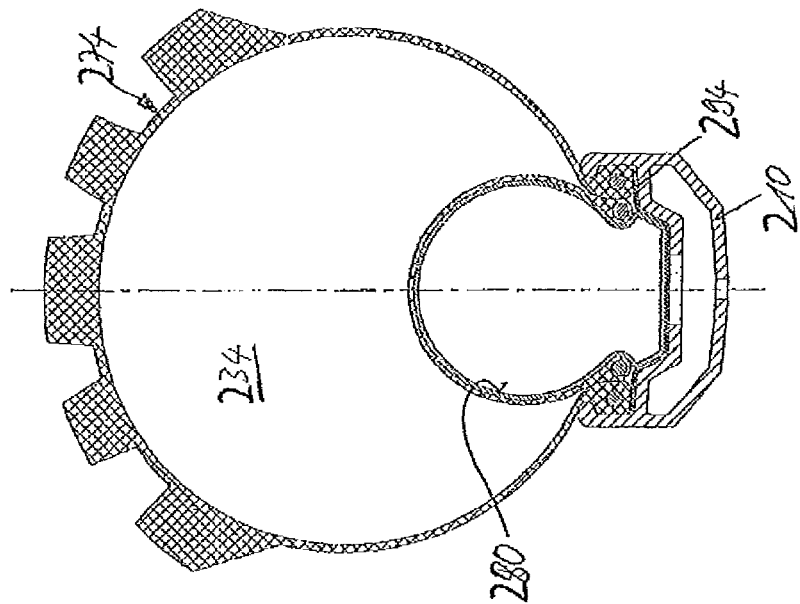
FIG. 29 a sectional view of the bicycle rim with the tire assembly of FIG. 28 remote from the valve region.

The illustration of FIG. 29 shows a view on a sectional plane of the tire assembly 274 of FIG. 28 remote from the region of the two-way valve 276. Apparent is that in this region, there is not more than a rim tape 294 disposed between the rim 210 and the tube 280, wherein said rim tape, incidentally, extends over the entire circumference of the rim 210. The valve reinforcement 89, however, is no longer present in the regions remote from the two-way valve 276. The rim tape 294 seals the spoke holes and serves on the valve 288 for a seal between valve 288 and rim 210.

The illustration of FIG. 30 shows a tire assembly 296 according to another embodiment of the invention. The tire assembly 296 includes the wheel tire 214 and the inner tire 228, as already explained with reference to FIG. 22. Merely for sake of completeness is noted that the tire 228 has the protrusions 252 which, as already explained, provide air ducts between the inner tire 228 and the wheel tire 214 via which ducts the interior space 234 between the inner tire 228 and the wheel tire 214 can be filled. Within the inner tire 228 is disposed a tube 298, cf. FIG. 31, which is provided with a per se conventional valve reinforcement 2100 and an equally conventional valve 2102. Via the valve 2102 the tube 298 can be filled with air.

Thus, the tire assembly according to FIG. 30 and FIG. 31 has two valves, namely, the valve 2102 to fill the tube 298 and a valve 2104 to fill the intermediate space 234 between the inner tire 228 and the wheel tire 214. Both the valves 2102, 2104 are mutually spaced, for example, offset by 180° on the rim 210. As apparent in FIG. 30 and FIG. 31, there is a rim tape 2106 disposed between the rim 210 and the tube 298, with the tape being thicker in the region of the valve 2104, cf. FIG. 30, wherein in said thicker region the valve 2104 is attached and, all the same, a transversely extending groove 2108 is provided which constitutes an air duct from an outlet opening of the valve 2104 between the bottom side of the tube 298 and the groove bottom in the thickened zone of the rim tape 2106. Said air duct 2108 leads from the valve 2104 to the left hand side and the right hand side, respectively, and then passes on into the air ducts formed between the tire beads of the inner tire 228 and the tire beads of the wheel tire 214 between the protrusions 252. Thus, by means of the valve 2104, the intermediate space 234 between the inner tire 228 and the wheel tire 214 can be filled independent of the tube 298 via the air ducts 2108 and the air ducts between the protrusions 252.

The illustration of FIG. 32 shows another section through the tire assembly 296 of the FIGS. 30 and 31. The sectional plane of FIG. 32 is remote from the two valves 2102, 2104. Apparent is that remote from the valves 2102, 2104 the rim tape 2106 does not have a thickened zone, but has a continuous constant material thickness over the width of the rim tape 2106. The rim tape 2106 acts as a seal on the spoke holes and on the valves 2102, 2104. Even the inner tire 228 is, remote from the valve 2104, no longer provided with protrusions 252. Owing to these measures, there can be a reduction in weight, since both the thickening of the rim tape 2106 is present only in the region where the valve 2104 is sitting and the air duct 2108 is needed, and also the protrusions 252 on the inner tire 228 are present only in the region of the valve 2104. Also, the valve reinforcement 2100 of the tube 298 is present only in the region where the valve 2102 is disposed.

Figure 33:
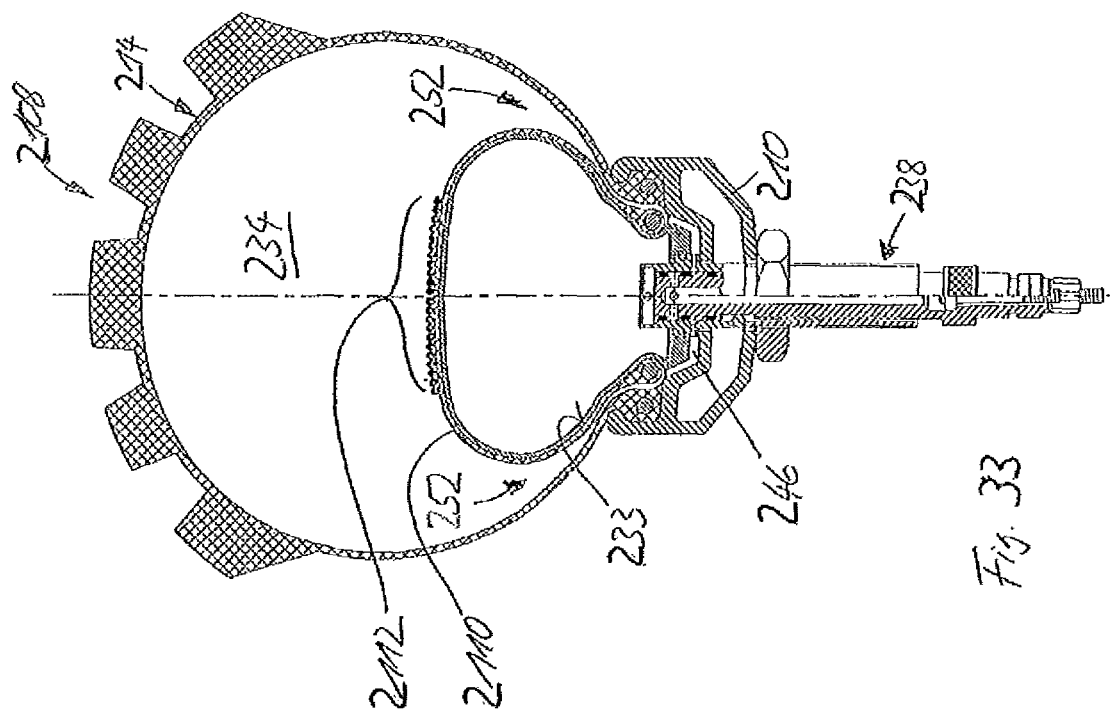
FIG. 33 a sectional view of a bicycle rim with a tire assembly according to the invention according to another embodiment in the valve region.

The illustration of FIG. 33 shows a sectional view of a tire assembly 2108 according to another embodiment of the invention. The wheel tire 214 is unchanged as compared to the embodiment of FIG. 22, and equally also the rim 210, and the two-way valve 238, and the tube 233. An inner tire 2110 has a different design concerning its outer shape than the inner tire 228 of FIG. 22, specifically, the inner tire 2110 is a belted tire and has in the region of its largest diameter 2112 a merely schematically sketched fabric belt, wherein this region is indicated in FIG. 33 by a curly bracket. Said fabric belt in region 2112 results in the fact that the inner tire 2110 in the region 2112 has a curvature of very large radius and provides an approximately planar surface in the region 2112. As a result, the side walls of the inner tire 2110 located lateral to the region 2112 are farther outward and, thus, closer to the interior side of the wheel tire 214. In case of important stresses on the wheel tire 214, for example, due to impacts or during rapid cornering, the wheel tire 214 can find support on the inner tire 2110. Consequently, there are positive effects on the riding characteristics of the wheel tire 214 and also increased safety.

In order to allow filling of the intermediate space 234 between the inner tire 2110 and the wheel tire 214, the inner tire 2110 is provided with the protrusions 252, like the inner tire 228 of FIG. 22. The air duct 246 between the rim 210 and the bottom side of the tube 233 has already been explained above with reference to the tire assembly 212 of FIG. 22.

Figure 34:
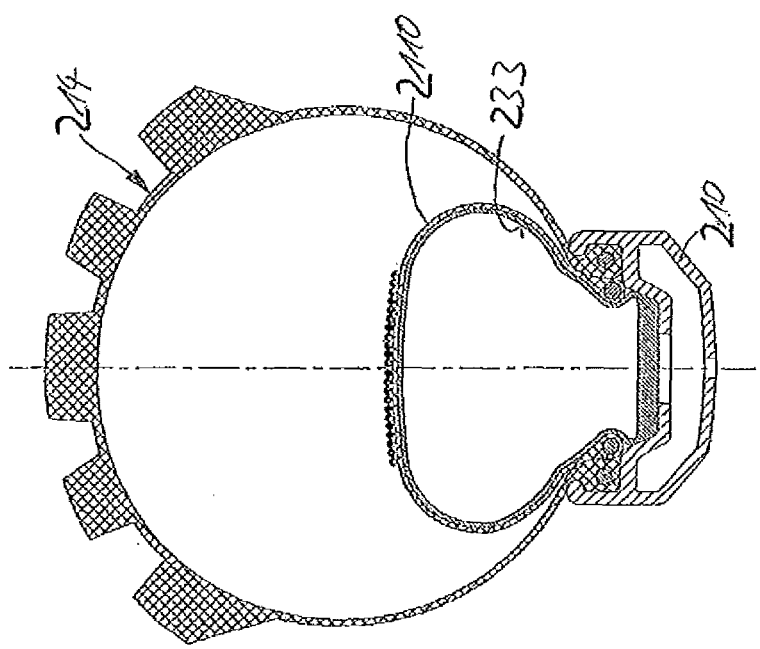
FIG. 34 a sectional view of the bicycle rim with the tire assembly of FIG. 33 remote from the valve region.

FIG. 34 shows a sectional view of the tire assembly 2108 remote from the two-way valve 238.

Figure 35:
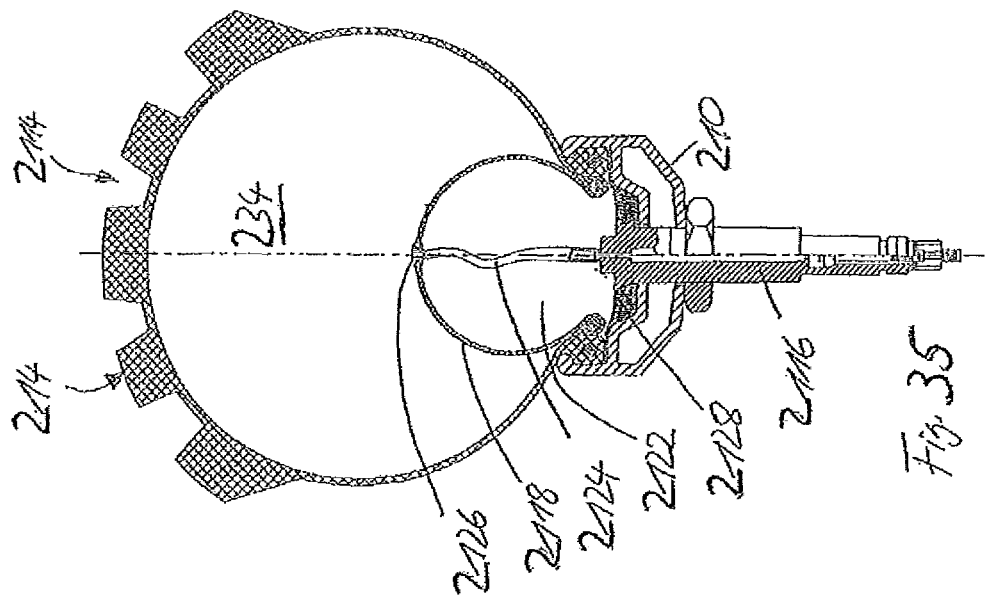
FIG. 35 a sectional view of a bicycle rim with a tire assembly according to the invention according to another embodiment in the region of a first valve.

The illustration of FIG. 35 shows another tire assembly 2114 according to the invention on a bicycle rim 210. The tire assembly 2114 includes the wheel tire 214 and a first valve 2116 for filling the intermediate space 234 between an inner tire 2118 and the wheel tire 214. Furthermore, the tire assembly 2114 has a second valve 2120, cf. FIG. 36, in order to fill a tube 2122 within the inner tire 2118.

From the first valve 2116 a flexible tube 2124 leads to a sheath 2126 in the wall of the inner tire 2118. The sheath 2126 provides a duct through the wall of the inner tire 2118. Thus, using the valve 2116, the intermediate space 234 between the inner tire 2118 and the wheel tire 214 can be filled via the flexible tube 2124 and the sheath 2126. The valve 2116 is fixed in a thickened portion 2128 of a rim tape which extends over the entire circumference of the rim 210, but has a constant and low thickness and acts as a seal in regions remote from the valve 2116, cf. FIG. 36 and FIG. 37.

Figure 36:
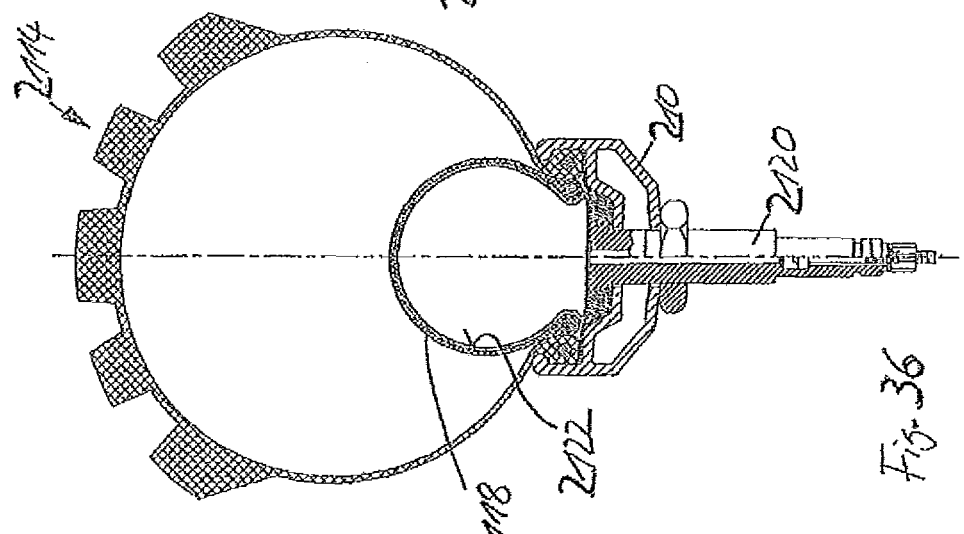
FIG. 36 a sectional view of the bicycle rim with the tire assembly of FIG. 35 in the region of a second valve.

The tube 2122 is provided with a valve reinforcement, cf. FIG. 36, whereon the valve 2120 is attached.

The tube 2122 is a tube with two closed ends. The tube 2122 is visible in the illustration of FIG. 35 in a view on a first closed end. The tube 2122 is placed on the rim 210 in such a way that the flexible tube 2124 is arranged between the two ends of the tube 2122. A tube of the type of tube 2122 with two ends is also referred to as "open tube". With a corresponding design of the ends of the tube 2122, so that these ends form an air duct between them, the flexible tube 2124 can be omitted.

Figure 37:
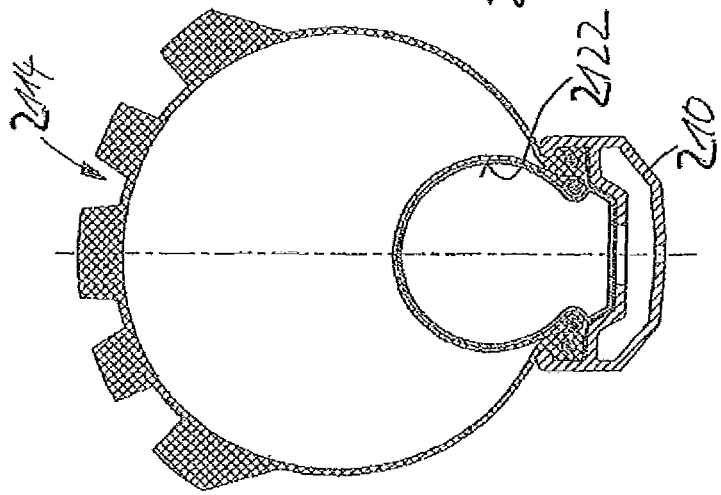
FIG. 37 a sectional view of the bicycle rim with the tire assembly of FIG. 35 in a region remote from the first and the second valve.

The illustration of FIG. 37 shows another section through the tire assembly 2114 remote from the valves 2116 and 2120. Apparent is that, remote from the valves 2116 and 2120, there is not more than the rim tape disposed between the rim 210 and the tube 2122.

The illustration of FIG. 38 shows another tire assembly 2130 according to the invention on the rim 210. A wheel tire 2132 is provided with a valve 2134 in its sidewall, via which valve the intermediate space 234 between the wheel tire 2132 and an inner tire 2136 can be filled directly. The valve 2134 is most compact and in particular has a very low height. The valve 2134 is inserted in a through opening in the wall of the wheel tire 2132 and adhesively bonded or vulcanized therein, for example. Since the intermediate space 234 is filled merely with a very low pressure, for example, 0.5 bar, the valve 2134 can be substantially more compact than the conventional valve 2120 for filling the conventional tube 2122. Specifically, the valve 2134 extends merely over a very short distance into the intermediate space 234. The valve 2134 can, for example, also be made completely of elastic synthetic material or elastic rubber. Also, the valve 2134 is arranged in a region of the side wall of the wheel tire 2132 which is already facing the rim 210. If the face of a clock is superposed on the cross section of the wheel tire 2132 as illustrated in FIG. 38, the valve 2134 would be located approximately at four o'clock. The location of the valve 2134 can be between approximately three o'clock and five o'clock. Owing to the specific, very compact and flat design of the valve 2134 and the location thereof, the valve 2134 will not interfere during riding operation.

The inner tire 2136 holds the tube 2122 on the rim 210 and presses, as already described, with its tire beads outwards against the interior sides of the tire beads of the wheel tire 2132 such that the latter beads in turn are pressed against the rim edges and thereby secure the wheel tire 2132 on the rim 210. There are no air ducts provided between the tire beads of the inner tire 2136 and the tire beads of the wheel tire 2132, since the intermediate space 234 between the inner tire 2136 and the wheel tire 2132 is, indeed, filled directly via the valve 2134.

The illustration of FIG. 39 shows a section through the tire assembly 2130 remote from the valve 2120.

Figure 40:
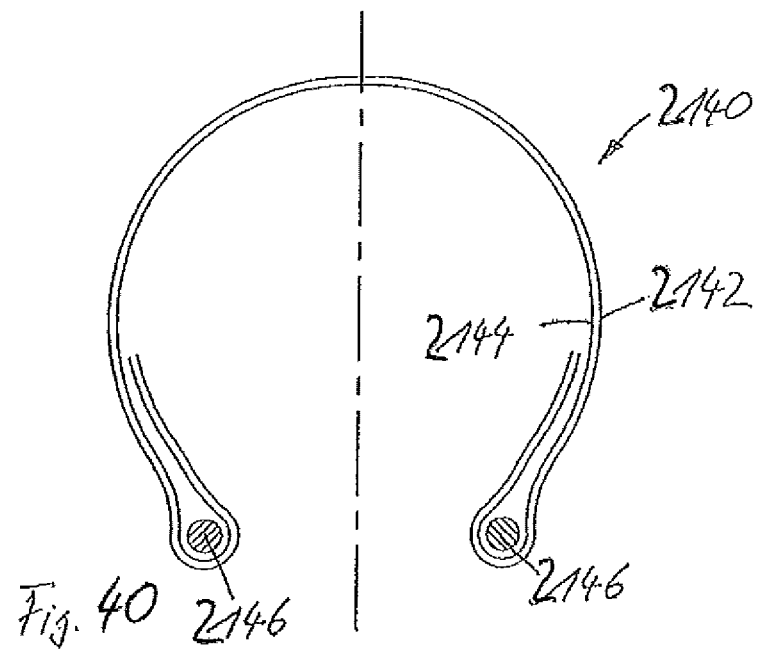
FIG. 40 a diagrammatic sectional view to illustrate carcass plies of an inner tire for the tire assembly according to the invention.

The illustration of FIG. 40 shows a diagrammatic sectional view of an inner tire 2140 for a tire assembly according to the invention. The illustration of FIG. 40 is to explain the arrangement of carcass plies in the inner tire 2140. Rubberizing of the carcass plies is not illustrated in FIG. 40, since usually the plies are embedded in rubber material.

However, it has to be noted that the inner tires of the tire assembly according to the invention can generally be implemented without a rubberizing of the fabric. The inner tires of the tire assembly according to the invention can be air permeable, since their object is merely to hold the tube, disposed within the inner tire, on the rim 210 and to transfer the inner pressure of the tube outwards onto the interior sides of the tire beads of the wheel tire, in order to press these beads against the rim edges. Within the scope of the invention, it is therefore definitely enabled and provided to construct the inner tire 2140 exclusively of cord fabric, or to embed the cord fabric of the inner tire 2140 merely in sections in rubber or elastic material. This applies also to the above described embodiments of inner tires for tire assemblies according to the invention and also to the inner tires to be described herein below.

The inner tire 2140 includes two carcass plies 2142 and 2144 which are folded inwards or outwards around tire beads 2146 from the outside. Such a construction is referred to as turn-up construction.

Figure 41:
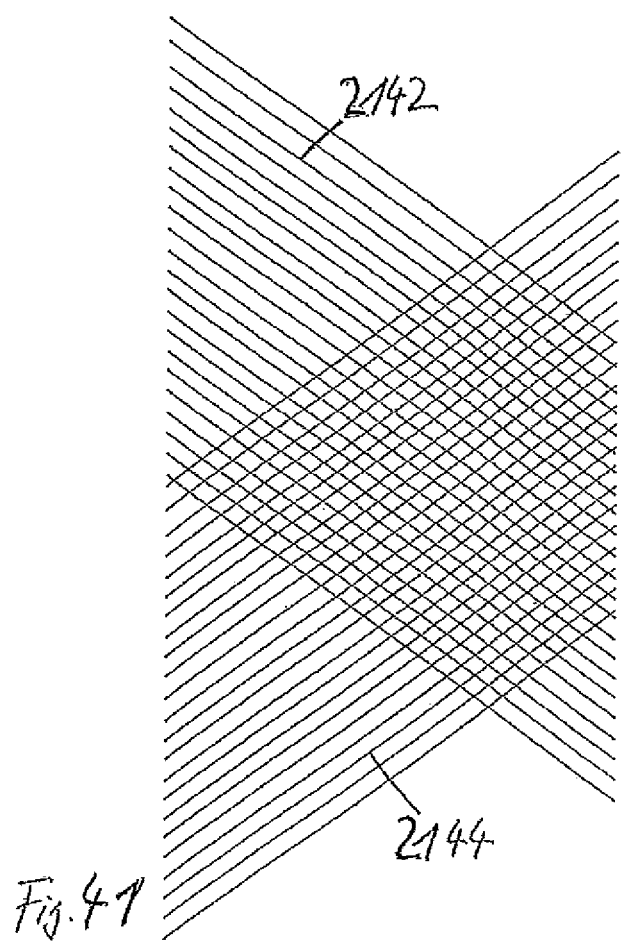
FIG. 41 a diagrammatic illustration to point out the directions of the carcass filaments in the inner tire of FIG. 40.

FIG. 41 shows the orientation of the filaments in the carcass plies 2142, 2144. Apparent is that the filaments of the carcass ply 2142 are arranged in an angle of somewhat less than 90° in relation to the fabric filaments of the carcass ply 2144, relative to the angle enclosed by the respective filaments on the right hand side and the left hand side, respectively, in FIG. 41. The angle can be between 60° and 120°.

Figure 42:
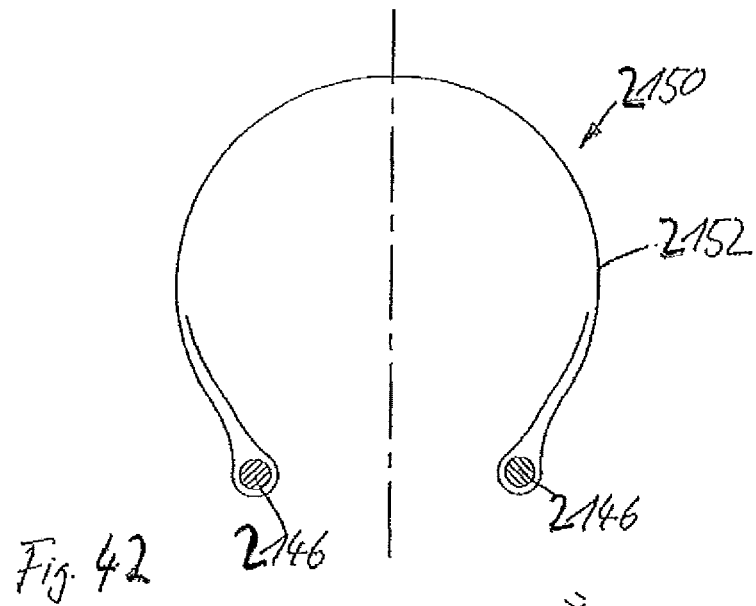
FIG. 42 a diagrammatic sectional view of an inner tire for the tire assembly according to the invention to illustrate the arrangement of a carcass ply in the inner tire.
Figure 43:
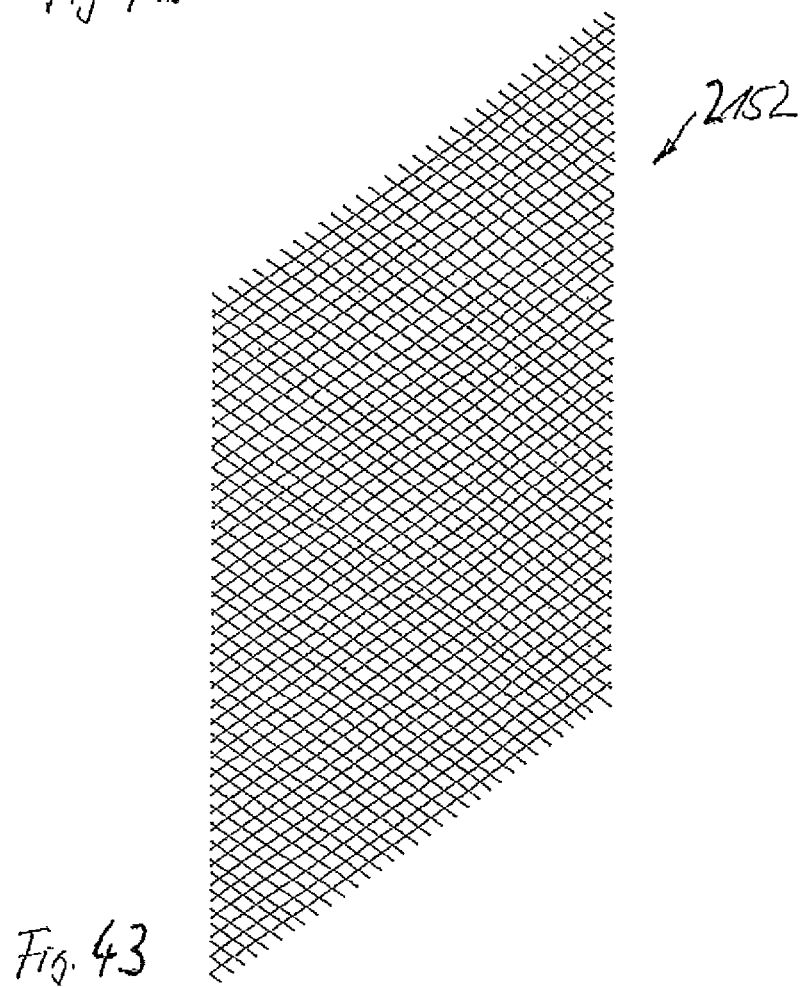
FIG. 43 a diagrammatic illustration to point out the orientation of the fabric filaments in the inner tire of FIG. 42.

The illustration of FIG. 42 shows diagrammatically another inner tire 2150 for a tire assembly according to the invention. The inner tire 2150 has merely one canvas fabric 2152 which is composed of fabric filaments, cf. FIG. 43, crossed in an angle of somewhat less than 90°, wherein the angle can be between 60° and 120°. The canvas fabric 2152 is folded around the bead cores 2146 from the outside or from the inside and led upwards again over a length on the interior side or the exterior side.

Figure 44:
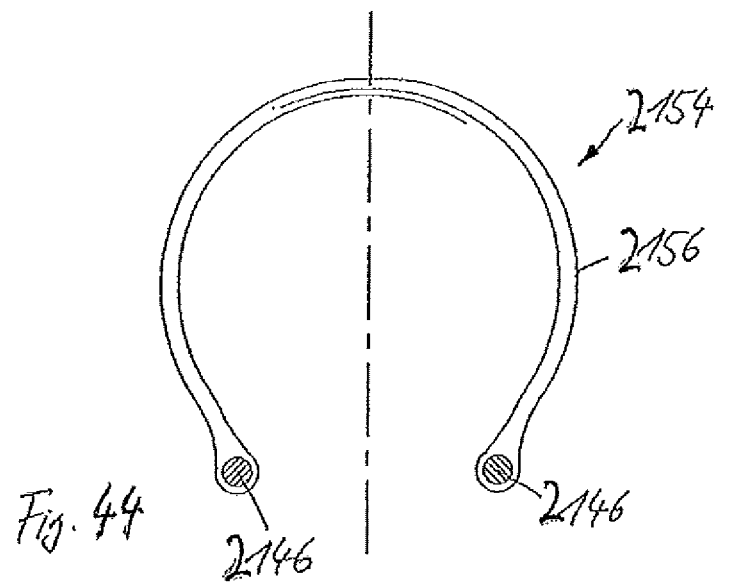
FIG. 44 a diagrammatic sectional view of an inner tire for the tire assembly according to the invention to illustrate the arrangement of a carcass ply in the inner tire.

The illustration of FIG. 44 shows another inner tire 2154 in a diagrammatic illustration. The inner tire 2154 is provided with two carcass plies which, however, are made of one single cord fabric piece 2156. The cord fabric piece 2156 is folded inwards or outwards around the bead reinforcements 2146 from the outside, but then led upwards far enough so that the ends of the cord fabric piece 2156 in the region of the largest diameter of the tire, that is, below the tread surface, overlap over a certain length. Thus, there are three cord fabric plies superimposed in the region of the tread surface, however, merely two cord fabric plies are provided in the region of the sidewalls.

Figure 45:
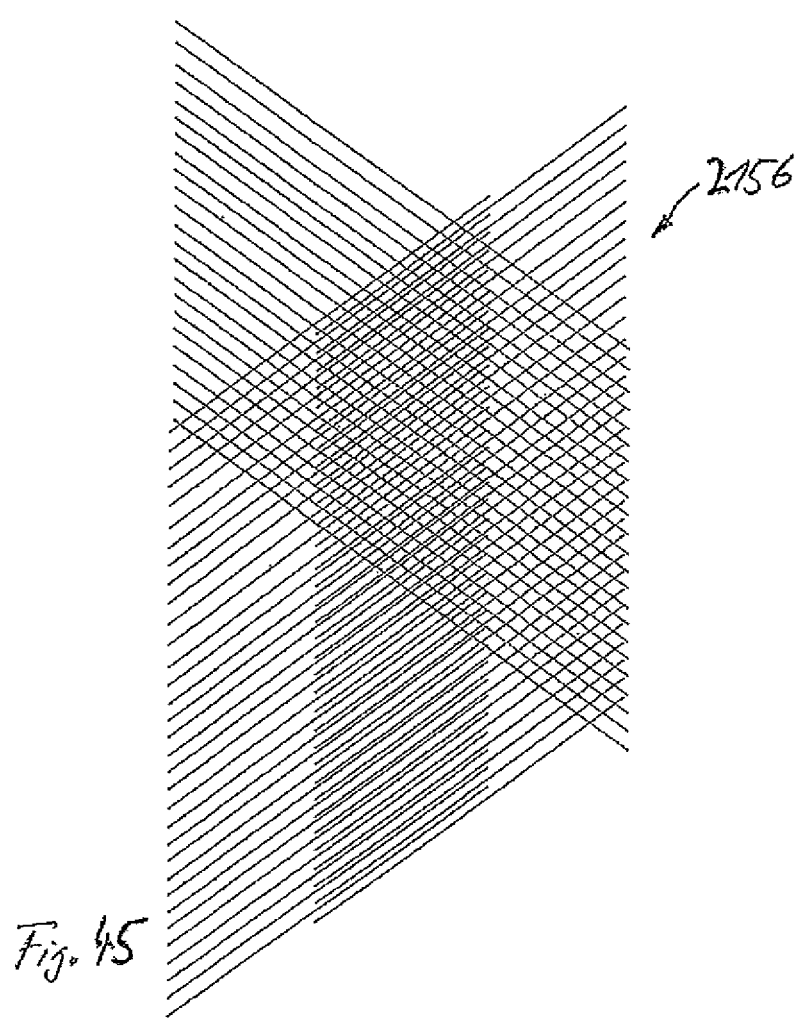
FIG. 45 a diagrammatic illustration of the orientation of the carcass filaments in the inner tire of FIG. 44.

FIG. 45 illustrates diagrammatically the orientation of the carcass filaments in the carcass 2156. Clearly apparent is the central overlapping region, wherein the two ends of the fabric 2156 are overlapping below the tread surface. Such a construction of the inner tire 2154 is referred to as French former construction.

Figure 46:
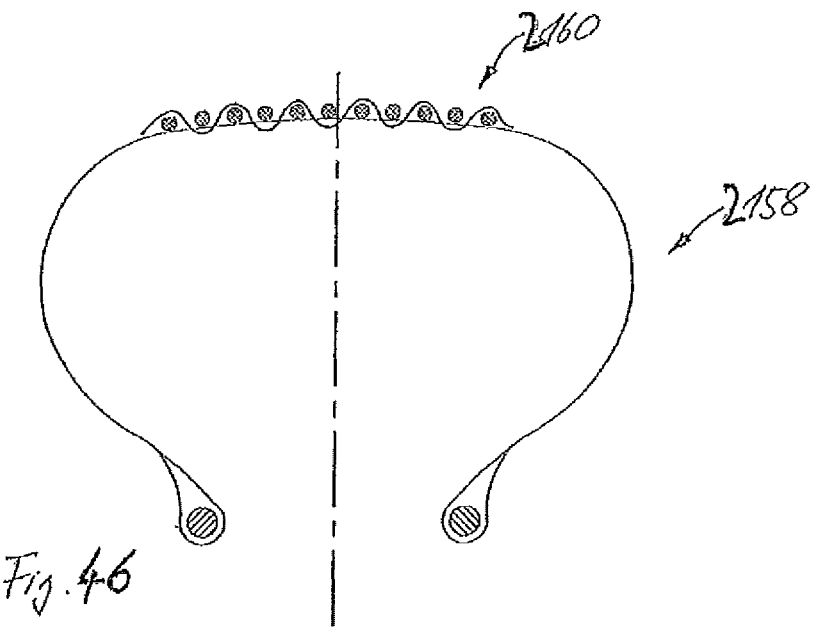
FIG. 46 a diagrammatic sectional view of an inner tire for the tire assembly according to the invention to illustrate the arrangement of a belt.
Figure 47:
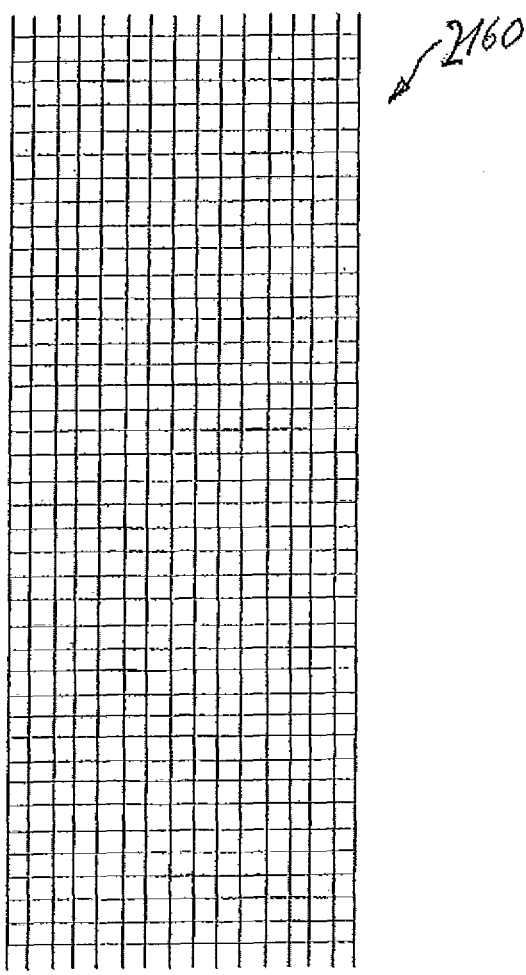
FIG. 47 a diagrammatic illustration to point out the orientation of the fabric filaments in the belt of FIG. 46.

The illustration of FIG. 46 shows an inner tire 2158 for the tire assembly according to the invention in a diagrammatic view. The tire 2158 has, like the inner tire 2110 of FIG. 33, a belted tire construction and includes a fabric belt 2160 in the region of its largest diameter. The fabric belt 2160 is composed of filaments extending circumferentially in the peripheral direction and fabric filaments oriented perpendicularly thereto, cf. FIG. 47. The fabric 2160 is referred to as canvas fabric.

Figure 48:
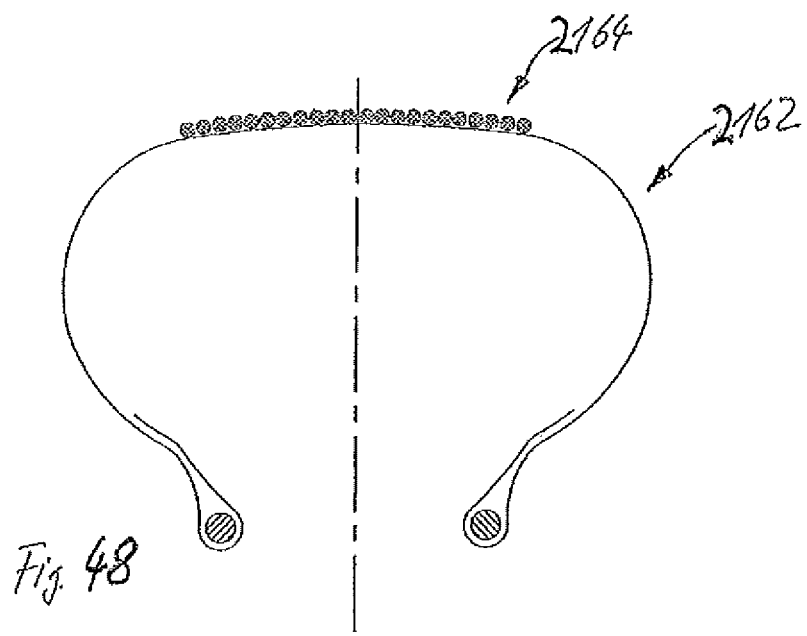
FIG. 48 a diagrammatic sectional view of an inner tire for the tire assembly according to the invention to illustrate the arrangement of an endless belt.
Figure 49:
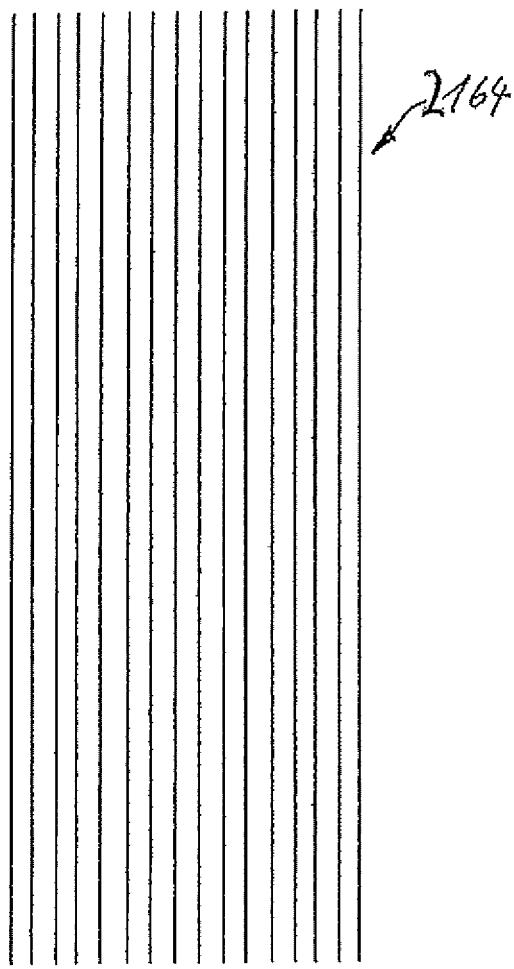
FIG. 49 a diagrammatic illustration to point out the orientation of the textile filaments in the endless belt of FIG. 48.

The illustration of FIG. 48 shows a diagrammatic view of another inner tire 2162 for a tire assembly according to the invention. Also, the tire 2162 has a belted tire construction and includes a fabric belt 2164 in the region of its largest diameter. The fabric belt 2164 is composed of merely one filament extending circumferentially in the peripheral direction. The belt 2164 is referred to as zero degree belt.

In order to facilitate mounting of the tire assembly 212, the tire beads 230, 232 of the inner tire 228 and the tire beads 220, 222 of the wheel tire 212 can be mutually connected, for example, sewn up together. Proper orientation of the inner tire 228 in relation to the wheel tire 214 is facilitated thereby. Conveniently, in such a case where the inner tire 228 is in fact sewn to the wheel tire 214, the tire beads 230, 232 of the inner tire 228 or the wheel tire 214 can even be omitted completely. If the inner tire 228 is sewn to the tire beads of the wheel tire 214, then the tire beads 220, 222 of the wheel tire 214 provide for the fact that the inner tire 228 holds the tube 233 reliably on the rim. As a consequence, the tire assembly can be embodied in a very light-weight manner. The inner tire 228 or the wheel tire 214 can be sewn or adhesively bonded or even vulcanized, for example, to the tire beads of the wheel tire and the inner tire, respectively.

Figure 50:
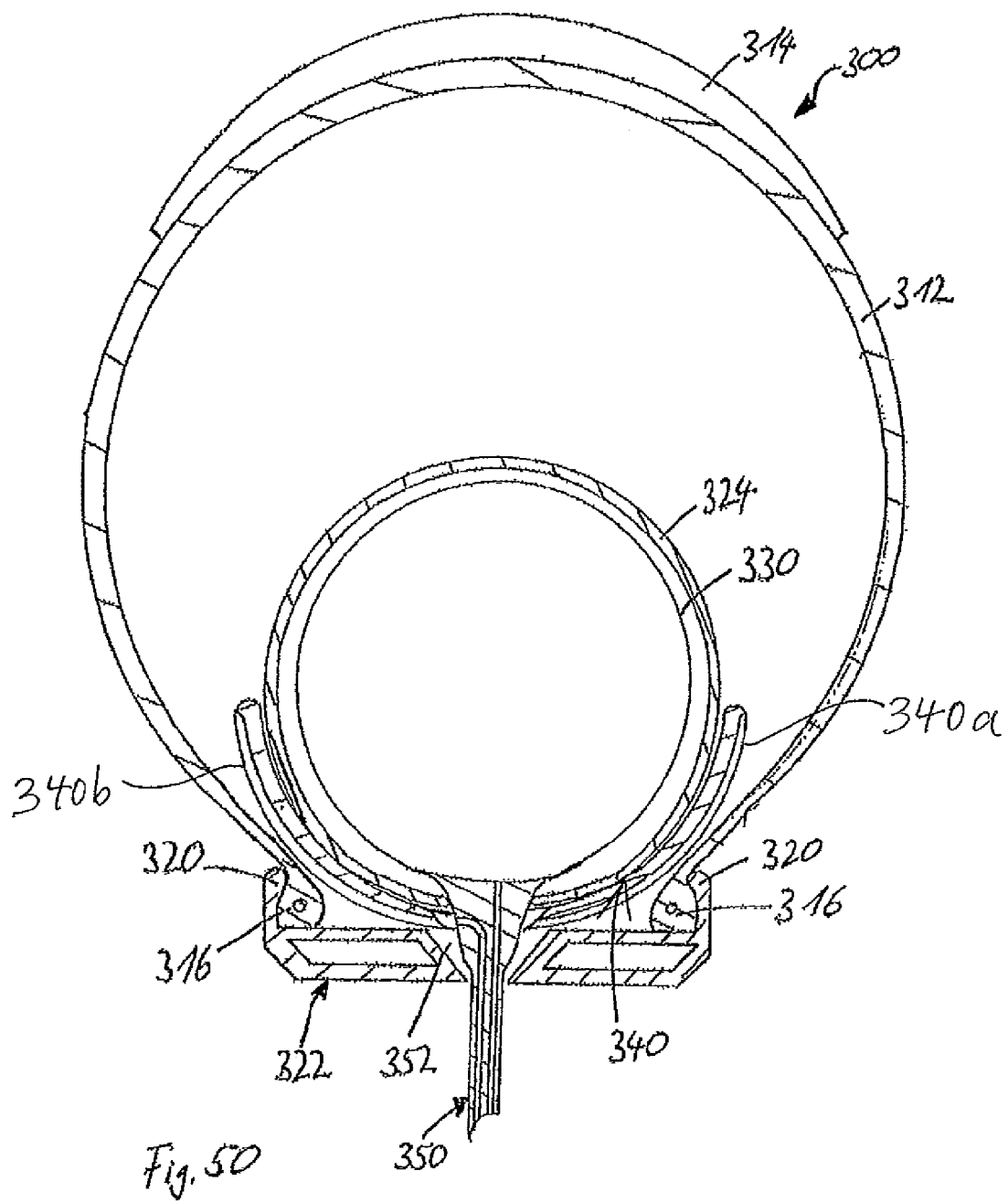
FIG. 50 a diagrammatic sectional view of a tire assembly according to another embodiment of the invention.

The illustration of FIG. 50 shows a diagrammatic sectional view of a tire assembly 300 according to another embodiment of the invention. The tire assembly includes a wheel tire 312 which is adapted to tubeless operation and, thus, is a so-called tubeless tire or tubeless ready tire. The bicycle tire 312 has a tread surface 314 and two tire beads 316, wherein the tire beads 316 in the mounted condition as illustrated bear on the interior side of the rim edges 320 of the rim 322. An inner tire 324 is a so-called tubular tire and, thus, has a toroidal shape. Within the inner tire 324 is disposed an equally toroidal tube 330. The inner tire 324 is, for example, sewn up and includes at least one pressure-resistant textile ply. Said textile ply can conveniently be rubberized. However, the inner tire 324 does not have a tread surface and, thus, can have a very light configuration.

Between the inner tire 324 and the rim 322 an insert part 340 is provided which in principle is designed similar to the insert part 40, as illustrated in the FIGS. 5 to 8. The insert part 340 has, in contrast to the insert part 40, ridges formed on both sides or on both portions 340a and 340b so that on both sides of a two-way valve 350 an air duct is formed between the inner tire 324 and the rim 322, and between the inner tire 324 and the wheel tire 312.

It should be noted in this context that the illustration of FIG. 50 is merely a diagrammatic view. In the mounted and filled condition, the tube 330 is filled with an air pressure of, for example, 10 bar. The tube 330 and the inner tire 324 are then pressed against the rim 322 and thereby hold the insert part 340 as well tightly against the rim and the wheel tire 312, respectively. In circumferential regions beyond the insert part 340, the inner tire 324 presses the beads 316 of the wheel tire 312 against the interior sides of the rim edges 320 and, thereby, holds the wheel tire 312 secure on the rim 322.

By means of the two-way valve the intermediate space between the rim 322 and the wheel tire 312 can be filled with a comparatively low pressure, in particular 3 bar to 3.5 bar, without a risk that the tire beads 316 disconnect from the rim edges 320. The illustration of FIG. 50, in fact showing an intermediate space between the insert part 340 and the wheel tire 312, is to be interpreted as a mere diagrammatic illustration. This applies also to the illustrations of the FIGS. 51 and 52.

Prior to mounting the tire assembly 300, an air-tight sealing of the spoke holes (not illustrated) of the rim 320 is provided first. A valve hole 352 in the rim 322 is sealed in that the valve 350 is provided with a matching sealing cone so that air is prevented from escaping through the valve hole 352. Then, at first, the wheel tire 312 with one of the beads 316 is mounted on the rim 322. Subsequently, the tubular tire, composed of the inner tire 324 and the tube 330, is arranged on the rim with the insert part placed over the valve 350. Finally, the second tire bead 316 is mounted on the rim 322. In this condition, according to the position of the two-way valve 350, either the tube 330 or the intermediate space between the rim 322 and the wheel tire 312 can then be filled. The diameter of the tubular tire is usually reduced during pumping up and thereby also fixes the wheel tire 312.

Figure 51:
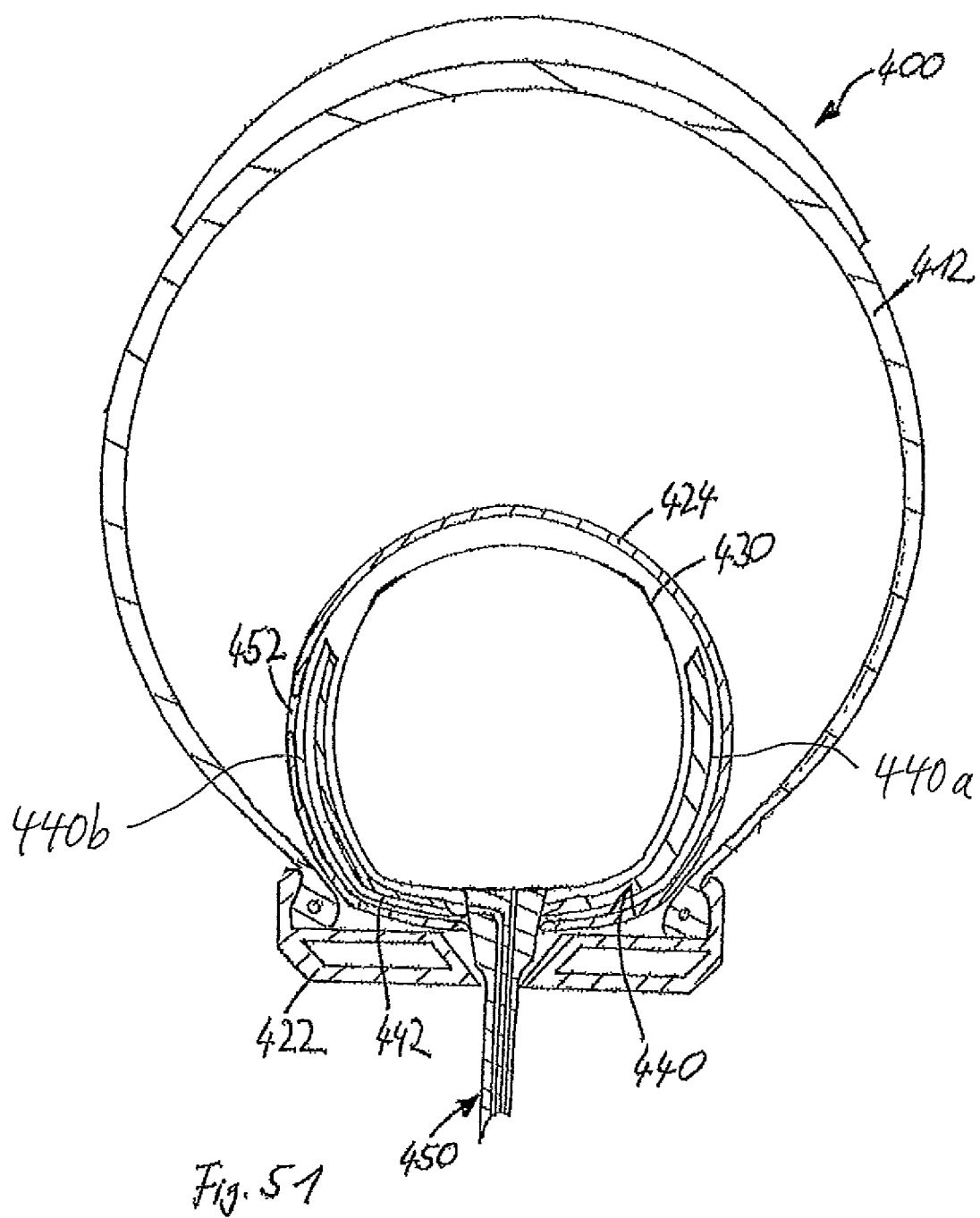
FIG. 51 a diagrammatic sectional view of a tire assembly according to a further embodiment of the invention.

The diagrammatic illustration of FIG. 51 shows another tire assembly 400 according to the invention. The tire assembly 400 is very similar to the tire assembly 300 of FIG. 50 and identical components of equal function are not described again. In contrast to the tire assembly 300, an insert part 440 is disposed between a tube 430 and an inner tire 424. Thus, during manufacture of a tubular tire composed of the inner tire 424 and the tube 430, the insert part 440 is arranged together with the tube 430 in the inner tire 424, wherein the inner tire 424 is then closed, for example, sewn up. The inner tire 424 and the tube 430 thereby form a so-called tubular tire. The insert part 440 has a pair of opposed portions 440a and 440b and, in the embodiment illustrated, merely on the left hand side in FIG. 51, ridges 442 forming air ducts between a two-way valve 450 and a through opening 452 in the inner tire 424. The through opening 452 is disposed in a region of the inner tire 424 where the textile plies of the inner tire overlap or provide the through opening with a reinforcement.

According to the position of the two-way valve 450, either the tube 430 is filled or the air passes via the air ducts formed by the ridges 442 of the insert part 440 between the inner tire 424 and the tube 430 to the through opening 452 and from there into the intermediate space between the rim 422 and the wheel tire 412.

The advantage of tire assembly 400 is that mounting faults may hardly occur, since the insert part 440, the inner tire 424, and the tube 430 are a unit which is mounted on the rim 422 as a whole.

Figure 52:
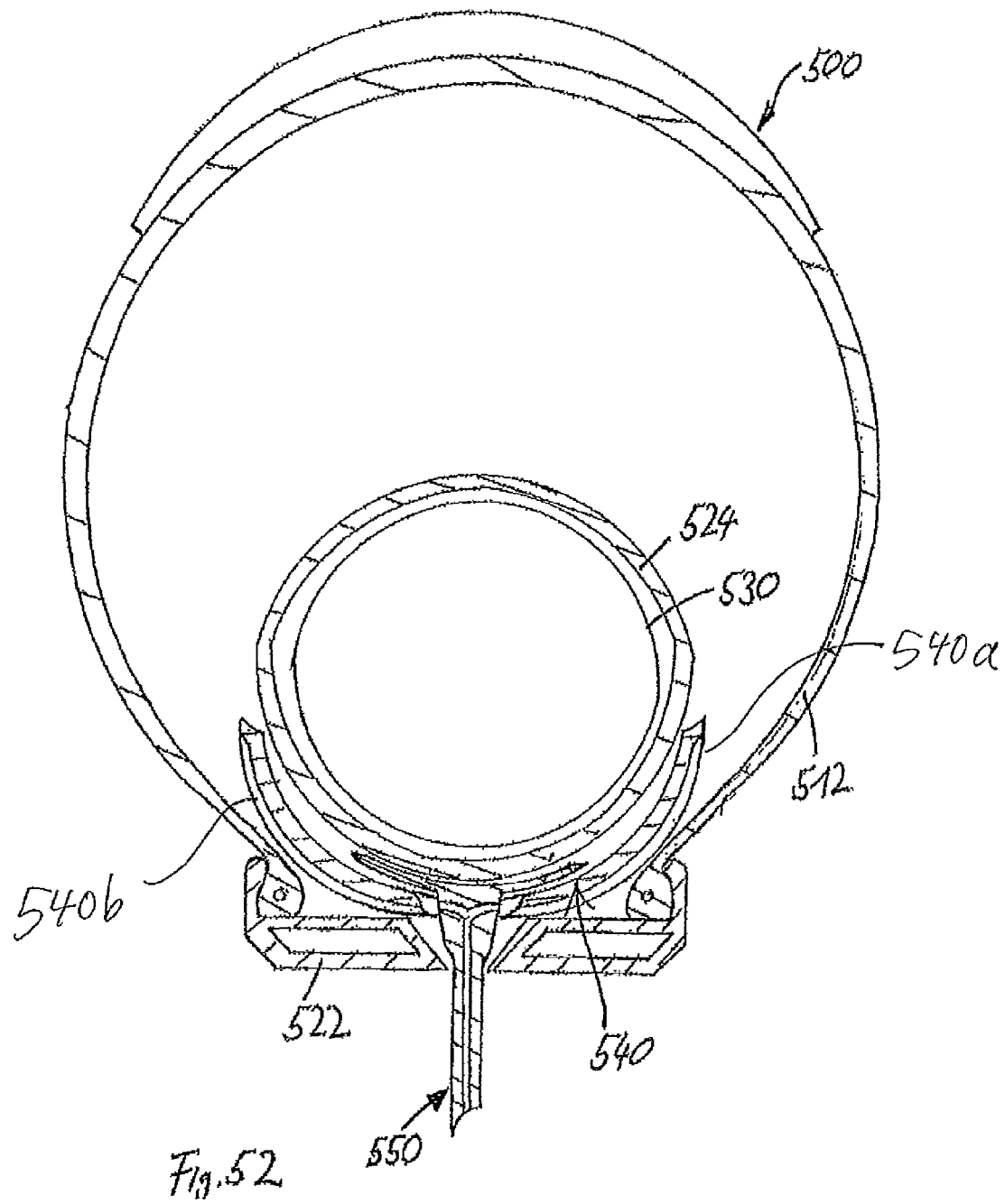
FIG. 52 a diagrammatic sectional view of a tire assembly according to a further embodiment of the invention.

The diagrammatic illustration of FIG. 52 shows another tire assembly 500 according to the invention. The tire assembly 500 is very similar to the tire assembly 300 of FIG. 50 and, therefore, merely the differences are explained, but components of equal function or identical components are not described again.

In contrast to the tire assembly 300 of FIG. 50, the tire assembly 500 includes two separate valves. Illustrated in FIG. 52 is merely one valve 550 which is disposed in the through hole of an insert part 540. The insert part 540 is disposed between the inner tire 524 and the rim 522 and also between the inner tire 524 and the wheel tire 512, and has substantially opposed portions 540a and 540b. The insert part 540 thereby forms an air duct between the inner tire 524 and the rim 522 and also between the inner tire 524 and the wheel tire 512 so that using the valve 550, the intermediate space between the rim 522 and the wheel tire 512 can be filled.

The inner tire 524 and the tube 530 constitute a so-called tubular tire which is provided with a further valve, not illustrated in FIG. 52. Thus, the rim 522 has two separate valve holes, wherein the valve 550 and also the additional (not illustrated) valve for filling the tube 530 each are provided with a sealing cone, in order to allow air-tight arrangement in the rim 522.

The invention claimed is:
1. A tire assembly for a bicycle rim, comprising:
a wheel tire with a tread surface and two tire beads which in a mounted condition respectively bear on interior sides of rim edges;
an inner tire which in a mounted condition is disposed within the wheel tire;

a tube which in a mounted condition is disposed within the inner tire;

a valve arrangement for filling with different fluid pressures, on the one hand, the tube and, on the other hand, an intermediate space defined by a rim and the wheel tire;

wherein the inner tire in a filled and the mounted condition bears on the tire beads of the wheel tire and presses the tire beads against the rim;

wherein an insert part is provided which in a mounted condition forms an air duct from the valve arrangement to the intermediate space, the insert part being disposed between the tube and the rim, between the inner tire and the rim, between the tube and the inner tire, and/or between the inner tire and the wheel tire, the insert part comprising a brace including a pair of substantially opposed portions disposed to engage a section of the tube or the inner tire therebetween, and a valve hole extending through the brace substantially centrally of the brace between the opposed portions.

2. The tire assembly according to claim 1, wherein the inner tire has a wall provided with a through opening, the through opening is in communication with the intermediate space, and the brace is disposed between the rim and the tube and between the tube and the inner tire, the brace forming an air duct between the rim and the tube and between the tube and the inner tire and extending up to the through opening in the inner tire.

3. The tire assembly according to claim 2, wherein the valve arrangement comprises a two-way valve, wherein a first outlet of the two-way valve is in communication with an interior space of the tube and a second outlet of the two-way valve is in communication with the air duct between the rim and the tube and between the tube and the inner tire up to the through opening in the inner tire.

4. The tire assembly according to claim 3, wherein the two-way valve is arranged on the brace and extends through the valve hole thereof.

5. The tire assembly according to claim 2, wherein the valve hole is configured for receiving a valve of the valve arrangement and the brace includes at least one trench defining at least one section of the air duct between the tube and the inner tire up to the through opening in the inner tire.

6. The tire assembly according to claim 1, wherein the valve arrangement includes two separate first and second valves, the first valve being in communication with an interior space of the tube and the second valve being arranged on the brace and being in communication with the air duct, the second valve extending through the valve hole of the brace.

7. The tire assembly according to claim 6, wherein the first valve and the second valve each have a sealing cone made of elastic material and configured for sealing engagement with a respective valve hole in the rim.

8. The tire assembly according to claim 7, wherein the second valve has a valve base plate made of elastic material extending in a circumferential direction of the tire assembly and arranged between the brace and the tube.

9. The tire assembly according to claim 1, wherein the inner tire is made of air-permeable fabric at least in sections.

10. The tire assembly according to claim 1, wherein the inner tire on an exterior side and the wheel tire on an interior side have at least partially exposed carcass filaments such that there is no air-tight sealing of a contact surface between the wheel tire and the inner tire.

11. The tire assembly according to claim 1, wherein the inner tire is made of fabric and the fabric is connected to two circumferential tire beads of the inner tire by sewing, vulcanization, welding, or adhesive bonding.

12. The tire assembly according to claim 11, wherein the tire beads of the inner tire are provided with a bead core including high tensile strength and high-modulus fibers comprising Zylon® fibers (PBO fibers), carbon fibers, or aramid fibers.

13. The tire assembly according to claim 1, wherein the inner tire includes a ply of canvas fabric and two tire beads, wherein edges of the fabric are folded towards an interior space of the inner tire or outwards around the tire beads.

14. The tire assembly according to claim 1, wherein the inner tire has a wall provided with a through opening, the through opening being in communication with the intermediate space, and the through opening of the inner tire is arranged in a region wherein at least two fabric plies of the inner tire overlap.

15. The tire assembly according to claim 1, further including means for sealing between the valve arrangement and the rim and for sealing spoke holes in the rim.

16. The tire assembly according to claim 1, wherein the brace is substantially U-shaped and the valve hole is disposed substantially centrally between the opposed portions thereof, the brace having oppositely-facing inner and outer surfaces, the inner surface facing towards the tube and the outer surface facing towards the wheel tire, the valve hole extending completely through the brace between the inner and outer surfaces thereof.

17. The tire assembly according to claim 1, wherein the opposed portions of the brace are configured to respectively engage opposed sections of the tube or the inner tire located on opposite sides thereof.

18. A wheel assembly comprising:
a rim;
a tire assembly comprising:
    a wheel tire with a tread surface and two tire beads which in a mounted condition respectively bear on interior sides of rim edges;
    an inner tire which in a mounted condition is disposed within the wheel tire;
    a tube which in a mounted condition is disposed within the inner tire; and
    a valve arrangement for filling with different fluid pressures, on the one hand, the tube and, on the other hand, an intermediate space defined by the rim and the wheel tire;
wherein the inner tire in a filled and the mounted condition bears on the tire beads of the wheel tire and presses the tire beads against the rim;
wherein an insert part is provided which in a mounted condition forms an air duct from the valve arrangement to the intermediate space, the insert part being disposed between the tube and the rim, between the inner tire and the rim, between the tube and the inner tire, and/or between the inner tire and the wheel tire, the insert part comprising a brace including a pair of substantially opposed portions disposed to engage a section of the tube or the inner tire therebetween, and a valve hole extending through the brace substantially centrally of the brace between the opposed portions;
wherein the valve arrangement includes two separate first and second valves, the first valve being in communication with an interior space of the tube and the second valve being arranged on the brace and being in communication with the air duct, the second valve extending through the valve hole of the brace;

wherein the rim includes a first valve hole through which the first valve extends and a second valve hole disposed adjacent the valve hole of the brace and through which the second valve extends.

19. A tire assembly comprising:
an outer tire including a tread surface and a pair of tire beads;
an inner tire disposed within the outer tire and having portions disposed adjacent the respective tire beads of the outer tire such that the portions bear against the respective tire beads of the outer tire and press same outwardly and away from one another;
a tube disposed within the inner tire and defining a hollow interior;
a valve arrangement for filling the interior of the tube to a first pressure and for filling a space defined within the outer tire to a second pressure different from the first pressure; and
an insert part disposed between the tube and the inner tire or between the inner tire and the outer tire, the insert part including a pair of substantially opposed legs disposed in bracing engagement with a section of the tube or a section of the inner tire, the insert part defining an air duct disposed to provide communication between the valve arrangement and the space within the outer tire, the insert part defining therein a valve hole extending through the insert substantially centrally between the opposed legs.

20. The tire assembly according to claim 19, wherein the valve arrangement includes a valve and the valve extends through the valve hole of the insert part and is in communication with the air duct.

21. The tire assembly according to claim 19, wherein the insert part is substantially U-shaped and the valve hole is disposed substantially centrally between the legs thereof, the insert part having oppositely-facing inner and outer surfaces, the inner surface facing towards the tube and the outer surface facing towards the outer tire, the valve hole extending completely transversely through the insert part between the inner and outer surfaces thereof.

* * * * *